(12) United States Patent
Chappa

(10) Patent No.: US 12,496,612 B2
(45) Date of Patent: Dec. 16, 2025

(54) COATING APPLICATION SYSTEM AND METHODS FOR COATING ROTATABLE MEDICAL DEVICES

(71) Applicant: Surmodics, Inc., Eden Prairie, MN (US)

(72) Inventor: Ralph A. Chappa, Ham Lake, MN (US)

(73) Assignee: Surmodics, Inc., Eden Prairie, MN (US)

(*) Notice: Subject to any disclaimer, the term of this patent is extended or adjusted under 35 U.S.C. 154(b) by 0 days.

(21) Appl. No.: 17/571,095

(22) Filed: Jan. 7, 2022

(65) Prior Publication Data

US 2022/0219194 A1     Jul. 14, 2022

Related U.S. Application Data

(60) Provisional application No. 63/135,279, filed on Jan. 8, 2021.

(51) Int. Cl.
*B05D 1/00*    (2006.01)
*A61L 29/16*   (2006.01)
(Continued)

(52) U.S. Cl.
CPC .............. *B05D 1/002* (2013.01); *A61L 29/16* (2013.01); *A61L 31/16* (2013.01); *A61M 25/10* (2013.01);
(Continued)

(58) Field of Classification Search
CPC .............. B05D 1/32; B05D 1/005; A61F 2/82
See application file for complete search history.

(56) References Cited

U.S. PATENT DOCUMENTS 273,410 A    3/1883   Wadleigh et al.
554,114 A    2/1896   Evertz
(Continued)

FOREIGN PATENT DOCUMENTS

CA    2351016    12/2001
CA    2874824    10/2021
(Continued)

OTHER PUBLICATIONS

File History for European Patent Application No. 04711809.6 downloaded Feb. 4, 2022 (265 pages).
(Continued)

*Primary Examiner* — Andrew J Bowman
(74) *Attorney, Agent, or Firm* — Pauly, DeVries Smith & Deffner LLC

(57) ABSTRACT

Embodiments herein relate to a system for coating rotatable medical devices and related methods. In an embodiment, a coating system for coating rotatable medical devices is included. The coating system can include a rotation mechanism, wherein the rotation mechanism is configured to mount and rotate a rotatable medical device. The coating system can also include a fluid applicator unit. The fluid applicator unit can include a rotating retention sleeve, the rotating retention sleeve defining a channel, wherein the rotatable medical device fits within the channel. The fluid applicator unit can also include a retention sleeve drive mechanism, wherein the retention sleeve drive mechanism is configured to rotate the rotating retention sleeve. The coating system can also include an inner collar, wherein the inner collar fits within the channel of the rotating retention sleeve. Other embodiments are also included herein.

12 Claims, 10 Drawing Sheets

(51) Int. Cl.
*A61L 31/16* (2006.01)
*A61M 25/10* (2013.01)

(52) U.S. Cl.
CPC . *A61F 2250/0067* (2013.01); *A61L 2300/606* (2013.01); *A61M 2025/105* (2013.01)

(56) References Cited

U.S. PATENT DOCUMENTS

| | | |
|---|---|---|
| 1,281,672 A | 10/1918 | Schorn |
| 1,866,100 A | 7/1932 | Hach |
| 2,253,019 A | 8/1941 | Crepeau |
| 2,329,438 A | 9/1943 | Fiedler |
| 2,330,880 A | 10/1943 | Gladfelter et al. |
| 2,335,116 A | 11/1943 | Hansen |
| 2,398,506 A | 4/1946 | Rogers |
| 2,493,787 A | 1/1950 | Torretti |
| 2,781,280 A | 2/1957 | Miller |
| 2,821,158 A | 1/1958 | Brown et al. |
| 2,881,461 A | 4/1959 | Parker |
| 3,198,170 A | 8/1965 | Toshio |
| 3,318,281 A | 5/1967 | Plegat |
| 3,348,964 A | 10/1967 | Good et al. |
| 3,416,530 A | 12/1968 | Ness |
| 3,466,131 A | 9/1969 | Arcudi |
| 3,502,494 A | 3/1970 | Ishiwata et al. |
| 3,625,214 A | 12/1971 | Higuchi |
| 3,645,773 A | 2/1972 | Herzhoff et al. |
| 3,663,292 A | 5/1972 | Herzhoff et al. |
| 3,669,917 A | 6/1972 | Ando et al. |
| 3,699,917 A | 10/1972 | Deverse et al. |
| 3,702,739 A | 11/1972 | Rentfrow |
| 3,723,120 A | 3/1973 | Hummel et al. |
| 3,736,199 A | 5/1973 | Mason |
| 3,837,805 A | 9/1974 | Boucher |
| 3,935,896 A | 2/1976 | Tegtmeier et al. |
| 3,936,549 A | 2/1976 | Kohler et al. |
| 3,963,069 A | 6/1976 | Marti et al. |
| 3,966,120 A | 6/1976 | Furgalus et al. |
| 4,000,745 A | 1/1977 | Goldberg |
| 4,016,306 A | 4/1977 | Miyagawa et al. |
| 4,051,805 A | 10/1977 | Waldrum |
| 4,060,116 A | 11/1977 | Frailly |
| 4,069,307 A | 1/1978 | Higuchi et al. |
| 4,073,335 A | 2/1978 | Fort et al. |
| 4,075,975 A | 2/1978 | Oswald |
| 4,082,870 A | 4/1978 | Yenni |
| 4,144,317 A | 3/1979 | Higuchi et al. |
| 4,146,036 A | 3/1979 | Dutcher et al. |
| 4,148,934 A | 4/1979 | Baker |
| 4,153,201 A | 5/1979 | Berger et al. |
| 4,174,678 A | 11/1979 | Van Den Bergh |
| 4,195,637 A | 4/1980 | Gruntzig et al. |
| 4,196,231 A | 4/1980 | Hubers |
| 4,197,338 A | 4/1980 | Perna |
| 4,206,756 A | 6/1980 | Grossan |
| 4,209,019 A | 6/1980 | Dutcher et al. |
| 4,240,373 A | 12/1980 | Anger |
| 4,257,343 A | 3/1981 | Kullander |
| 4,289,089 A | 9/1981 | Tacke et al. |
| 4,292,965 A | 10/1981 | Nash |
| 4,300,557 A | 11/1981 | Refojo et al. |
| 4,301,968 A | 11/1981 | Berger et al. |
| 4,304,765 A | 12/1981 | Shell et al. |
| 4,337,896 A | 7/1982 | Berger et al. |
| 4,352,459 A | 10/1982 | Berger et al. |
| 4,364,879 A | 12/1982 | Gut et al. |
| 4,375,820 A | 3/1983 | Vinarcsik et al. |
| 4,415,654 A | 11/1983 | Pohl |
| 4,475,972 A | 10/1984 | Wong |
| 4,502,492 A | 3/1985 | Bornzin |
| 4,503,802 A | 3/1985 | Keller et al. |
| 4,541,564 A | 9/1985 | Berger et al. |
| 4,544,626 A | 10/1985 | Sullivan |
| 4,567,934 A | 2/1986 | Nakao et al. |
| 4,572,451 A | 2/1986 | Ikeda et al. |
| 4,575,330 A | 3/1986 | Hull |
| 4,603,058 A | 7/1986 | Adams |
| 4,616,593 A | 10/1986 | Kawamura et al. |
| 4,622,917 A | 11/1986 | Schramm |
| 4,638,045 A | 1/1987 | Kohn et al. |
| 4,655,393 A | 4/1987 | Berger |
| 4,678,466 A | 7/1987 | Rosenwald |
| 4,723,708 A | 2/1988 | Berger et al. |
| 4,743,252 A | 5/1988 | Martin et al. |
| 4,764,377 A | 8/1988 | Goodson |
| 4,767,229 A | 8/1988 | Cha |
| 4,819,661 A | 4/1989 | Heil et al. |
| 4,824,017 A | 4/1989 | Mansfield |
| 4,839,017 A | 6/1989 | Taniguchi et al. |
| 4,853,224 A | 8/1989 | Wong |
| 4,863,457 A | 9/1989 | Lee et al. |
| 4,886,625 A | 12/1989 | Albarella et al. |
| 4,892,736 A | 1/1990 | Goodson |
| 4,927,741 A | 5/1990 | Garth et al. |
| 4,953,564 A | 9/1990 | Berthlelsen |
| 4,959,217 A | 9/1990 | Sanders et al. |
| 4,971,895 A | 11/1990 | Sullivan |
| 4,972,848 A | 11/1990 | Di Domenico et al. |
| 4,978,067 A | 12/1990 | Berger et al. |
| 4,979,959 A | 12/1990 | Guire |
| 4,988,883 A | 1/1991 | Oppawsky |
| 4,997,652 A | 3/1991 | Wong et al. |
| 5,002,067 A | 3/1991 | Berthelsen et al. |
| 5,002,582 A | 3/1991 | Guire et al. |
| 5,003,992 A | 4/1991 | Holleman et al. |
| 5,036,634 A | 8/1991 | Lessard et al. |
| 5,041,089 A | 8/1991 | Mueller et al. |
| 5,049,404 A | 9/1991 | Kisler et al. |
| 5,069,940 A | 12/1991 | Wenrick |
| 5,071,337 A | 12/1991 | Heller et al. |
| 5,076,285 A | 12/1991 | Hess et al. |
| 5,076,974 A | 12/1991 | Modrek et al. |
| 5,087,246 A | 2/1992 | Smith |
| 5,090,084 A | 2/1992 | De |
| 5,098,443 A | 3/1992 | Parel et al. |
| 5,102,402 A | 4/1992 | Dror et al. |
| 5,114,719 A | 5/1992 | Sabel et al. |
| 5,116,638 A | 5/1992 | Mino et al. |
| 5,120,312 A | 6/1992 | Wigness et al. |
| 5,164,188 A | 11/1992 | Wong |
| 5,183,509 A | 2/1993 | Brown et al. |
| 5,207,343 A | 5/1993 | Bogadi |
| 5,210,217 A | 5/1993 | Albarella et al. |
| 5,219,120 A | 6/1993 | Ehrenberg et al. |
| 5,219,690 A | 6/1993 | Hammond |
| 5,221,698 A | 6/1993 | Amiden et al. |
| 5,229,128 A | 7/1993 | Haddad et al. |
| 5,246,867 A | 9/1993 | Maliwal et al. |
| 5,248,526 A | 9/1993 | Ogawa |
| 5,248,752 A | 9/1993 | Argyropoulos et al. |
| 5,254,164 A | 10/1993 | Masahumi |
| 5,254,627 A | 10/1993 | Rossi et al. |
| 5,255,693 A | 10/1993 | Dutcher et al. |
| 5,260,115 A | 11/1993 | Mino et al. |
| 5,263,992 A | 11/1993 | Guire |
| 5,274,046 A | 12/1993 | Rossi et al. |
| 5,300,108 A | 4/1994 | Rebell et al. |
| 5,300,114 A | 4/1994 | Gwon |
| 5,302,146 A | 4/1994 | Yamamoto et al. |
| 5,304,121 A | 4/1994 | Sahatjian |
| 5,310,559 A | 5/1994 | Shah et al. |
| 5,314,419 A | 5/1994 | Pelling et al. |
| 5,318,587 A | 6/1994 | Davey |
| 5,324,325 A | 6/1994 | Moaddeb |
| 5,328,961 A | 7/1994 | Rossi et al. |
| 5,344,298 A | 9/1994 | Hull |
| 5,352,574 A | 10/1994 | Guiseppi-Elie |
| 5,364,343 A | 11/1994 | Apolet et al. |
| 5,372,577 A | 12/1994 | Ungerleider |
| 5,378,475 A | 1/1995 | Smith et al. |
| 5,382,234 A | 1/1995 | Cornelius et al. |
| 5,385,148 A | 1/1995 | Lesh et al. |
| 5,387,247 A | 2/1995 | Vallana et al. |
| 5,395,618 A | 3/1995 | Darougar et al. |

(56) References Cited

U.S. PATENT DOCUMENTS

| | | |
|---|---|---|
| 5,405,376 A | 4/1995 | Mulier et al. |
| 5,405,631 A | 4/1995 | Rosenthal |
| 5,410,773 A | 5/1995 | Forkner |
| 5,413,638 A | 5/1995 | Bernstein, Jr. et al. |
| 5,414,075 A | 5/1995 | Swan et al. |
| 5,421,979 A | 6/1995 | Stevenson |
| 5,423,777 A | 6/1995 | Tajiri et al. |
| 5,423,956 A | 6/1995 | White et al. |
| 5,431,649 A | 7/1995 | Mulier et al. |
| 5,437,656 A | 8/1995 | Shikani et al. |
| 5,443,505 A | 8/1995 | Wong et al. |
| 5,447,724 A | 9/1995 | Helmus et al. |
| 5,449,382 A | 9/1995 | Dayton |
| 5,462,696 A | 10/1995 | Bunk et al. |
| 5,464,650 A | 11/1995 | Berg et al. |
| 5,466,233 A | 11/1995 | Weiner et al. |
| 5,472,436 A | 12/1995 | Fremstad |
| 5,476,511 A | 12/1995 | Gwon et al. |
| 5,501,735 A | 3/1996 | Pender |
| 5,501,856 A | 3/1996 | Ohtori et al. |
| 5,512,055 A | 4/1996 | Domb et al. |
| 5,512,329 A | 4/1996 | Guire et al. |
| 5,525,348 A | 6/1996 | Whitbourne et al. |
| 5,527,389 A | 6/1996 | Rosenblum et al. |
| 5,538,353 A | 7/1996 | Dehavilland |
| 5,545,208 A | 8/1996 | Wolff et al. |
| 5,556,633 A | 9/1996 | Haddad et al. |
| 5,563,056 A | 10/1996 | Swan et al. |
| 5,571,089 A | 11/1996 | Crocker |
| 5,578,075 A | 11/1996 | Dayton |
| 5,578,247 A | 11/1996 | White et al. |
| 5,582,616 A | 12/1996 | Bolduc et al. |
| 5,591,227 A | 1/1997 | Dinh et al. |
| 5,605,696 A | 2/1997 | Eury et al. |
| 5,609,629 A | 3/1997 | Fearnot et al. |
| 5,618,568 A | 4/1997 | Seckora et al. |
| 5,624,411 A | 4/1997 | Tuch |
| 5,624,975 A | 4/1997 | Valencia |
| 5,626,919 A | 5/1997 | Chapman et al. |
| 5,630,879 A | 5/1997 | Eichmann et al. |
| 5,637,113 A | 6/1997 | Tartaglia et al. |
| 5,637,460 A | 6/1997 | Swan et al. |
| 5,643,362 A | 7/1997 | Garves |
| 5,645,592 A | 7/1997 | Nicolais et al. |
| 5,651,986 A | 7/1997 | Brem |
| 5,656,332 A | 8/1997 | Saito et al. |
| 5,658,387 A | 8/1997 | Reardon et al. |
| 5,673,473 A | 10/1997 | Johnson et al. |
| 5,679,400 A | 10/1997 | Tuch |
| 5,714,360 A | 2/1998 | Swan et al. |
| 5,716,151 A | 2/1998 | Satake |
| 5,725,493 A | 3/1998 | Avery et al. |
| 5,743,964 A | 4/1998 | Pankake |
| 5,744,515 A | 4/1998 | Clapper |
| 5,766,242 A | 6/1998 | Wong et al. |
| 5,766,934 A | 6/1998 | Guiseppi-Elie |
| 5,773,019 A | 6/1998 | Ashton et al. |
| 5,776,101 A | 7/1998 | Goy |
| 5,788,772 A | 8/1998 | Kunieda et al. |
| 5,807,331 A | 9/1998 | Den Heijer et al. |
| 5,807,395 A | 9/1998 | Mulier et al. |
| 5,810,836 A | 9/1998 | Hussein et al. |
| 5,821,309 A | 10/1998 | Oka |
| 5,824,072 A | 10/1998 | Wong |
| 5,830,173 A | 11/1998 | Avery et al. |
| 5,833,715 A | 11/1998 | Vachon et al. |
| 5,833,891 A | 11/1998 | Subramaniam et al. |
| 5,837,008 A | 11/1998 | Berg et al. |
| 5,837,088 A | 11/1998 | Palmgren et al. |
| 5,837,313 A | 11/1998 | Ding et al. |
| 5,837,859 A | 11/1998 | Teoule et al. |
| 5,849,359 A | 12/1998 | Burns et al. |
| 5,858,435 A | 1/1999 | Gallo |
| 5,868,697 A | 2/1999 | Richter et al. |
| 5,877,224 A | 3/1999 | Brocchini et al. |
| 5,882,336 A | 3/1999 | Janacek |
| 5,882,405 A | 3/1999 | Kish et al. |
| 5,886,026 A | 3/1999 | Hunter et al. |
| 5,897,911 A | 4/1999 | Loeffler |
| 5,904,144 A | 5/1999 | Hammage et al. |
| 5,913,653 A | 6/1999 | Kempf |
| 5,921,982 A | 7/1999 | Lesh et al. |
| 5,925,885 A | 7/1999 | Clark et al. |
| 5,928,662 A | 7/1999 | Phillips |
| 5,972,027 A | 10/1999 | Johnson |
| 5,972,369 A | 10/1999 | Roorda et al. |
| 5,976,256 A | 11/1999 | Kawano |
| 5,980,972 A | 11/1999 | Ding |
| 5,989,579 A | 11/1999 | Darougar et al. |
| 5,991,667 A | 11/1999 | Feith |
| 5,992,568 A | 11/1999 | Craig et al. |
| 5,997,517 A | 12/1999 | Whitbourne |
| 6,001,386 A | 12/1999 | Ashton et al. |
| 6,001,425 A | 12/1999 | Stash et al. |
| 6,019,784 A | 2/2000 | Hines |
| 6,030,550 A | 2/2000 | Angelopoulos et al. |
| 6,033,582 A | 3/2000 | Lee et al. |
| 6,053,924 A | 4/2000 | Hussein |
| 6,056,998 A | 5/2000 | Fujimoto |
| 6,070,697 A | 6/2000 | Millard |
| 6,074,661 A | 6/2000 | Olejnik et al. |
| 6,091,978 A | 7/2000 | Johnson et al. |
| 6,094,887 A | 8/2000 | Swank et al. |
| 6,096,070 A | 8/2000 | Ragheb et al. |
| 6,096,825 A | 8/2000 | Garnier |
| 6,099,562 A | 8/2000 | Ding et al. |
| 6,099,757 A | 8/2000 | Kulkarni |
| 6,102,887 A | 8/2000 | Altman |
| 6,110,483 A | 8/2000 | Whitbourne et al. |
| 6,117,456 A | 9/2000 | Lee et al. |
| 6,117,554 A | 9/2000 | Allan et al. |
| 6,120,536 A | 9/2000 | Ding et al. |
| 6,129,933 A | 10/2000 | Oshlack et al. |
| 6,143,037 A | 11/2000 | Goldstein et al. |
| 6,153,252 A | 11/2000 | Hossainy et al. |
| 6,156,373 A | 12/2000 | Zhong et al. |
| 6,156,526 A | 12/2000 | Newman |
| 6,160,103 A | 12/2000 | Marchand et al. |
| 6,165,526 A | 12/2000 | Newman et al. |
| 6,177,095 B1 | 1/2001 | Sawhney et al. |
| 6,187,370 B1 | 2/2001 | Dinh et al. |
| 6,190,077 B1 | 2/2001 | Newson et al. |
| 6,193,909 B1 | 2/2001 | Angelopoulos et al. |
| 6,197,324 B1 | 3/2001 | Crittenden |
| 6,197,881 B1 | 3/2001 | Cosnier et al. |
| 6,197,949 B1 | 3/2001 | Teoule et al. |
| 6,201,086 B1 | 3/2001 | Garnier et al. |
| 6,203,551 B1 | 3/2001 | Wu |
| 6,203,556 B1 | 3/2001 | Evans et al. |
| 6,203,732 B1 | 3/2001 | Clubb et al. |
| 6,207,337 B1 | 3/2001 | Swain |
| 6,212,434 B1 | 4/2001 | Scheiner et al. |
| 6,214,008 B1 | 4/2001 | Illi |
| 6,214,115 B1 | 4/2001 | Taylor et al. |
| 6,214,901 B1 | 4/2001 | Chudzik et al. |
| 6,217,895 B1 | 4/2001 | Guo et al. |
| 6,218,016 B1 | 4/2001 | Tedeschi |
| 6,245,089 B1 | 6/2001 | Daniel et al. |
| 6,245,099 B1 | 6/2001 | Edwin et al. |
| 6,248,112 B1 | 6/2001 | Gambale et al. |
| 6,251,090 B1 | 6/2001 | Avery et al. |
| 6,251,136 B1 | 6/2001 | Guruwaiya et al. |
| 6,251,418 B1 | 6/2001 | Ahern et al. |
| 6,254,921 B1 | 7/2001 | Chappa et al. |
| 6,278,018 B1 | 8/2001 | Swan |
| 6,279,505 B1 | 8/2001 | Plester et al. |
| 6,287,285 B1 | 9/2001 | Michal et al. |
| 6,290,728 B1 | 9/2001 | Phelps et al. |
| 6,298,272 B1 | 10/2001 | Peterfeso et al. |
| 6,303,148 B1 | 10/2001 | Hennink et al. |
| 6,306,125 B1 | 10/2001 | Parker et al. |
| 6,306,426 B1 | 10/2001 | Olejnik et al. |
| 6,309,370 B1 | 10/2001 | Haim et al. |
| 6,315,926 B1 | 11/2001 | Jansen et al. |

(56) References Cited

U.S. PATENT DOCUMENTS

| | | |
|---|---|---|
| 6,322,847 B1 | 11/2001 | Zhong et al. |
| RE37,463 E | 12/2001 | Altman |
| 6,331,313 B1 | 12/2001 | Wong et al. |
| 6,333,595 B1 | 12/2001 | Horikawa et al. |
| 6,344,035 B1 | 2/2002 | Chudzik et al. |
| 6,345,630 B2 | 2/2002 | Fishkin et al. |
| 6,358,247 B1 | 3/2002 | Altman et al. |
| 6,358,556 B1 | 3/2002 | Ding et al. |
| 6,360,129 B1 | 3/2002 | Ley et al. |
| 6,368,658 B1 | 4/2002 | Schwarz et al. |
| 6,375,972 B1 | 4/2002 | Guo et al. |
| 6,383,415 B1 | 5/2002 | Angelopoulos et al. |
| 6,394,995 B1 | 5/2002 | Solar et al. |
| 6,395,326 B1 | 5/2002 | Castro et al. |
| 6,399,144 B2 | 6/2002 | Dinh et al. |
| 6,399,655 B1 | 6/2002 | De et al. |
| 6,399,704 B1 | 6/2002 | Laurin et al. |
| 6,406,754 B2 | 6/2002 | Chappa et al. |
| 6,431,770 B1 | 8/2002 | Kurematsu et al. |
| 6,435,959 B1 | 8/2002 | Skrmetta |
| 6,451,373 B1 | 9/2002 | Hossainy et al. |
| 6,478,776 B1 | 11/2002 | Roseman et al. |
| 6,497,691 B1 | 12/2002 | Bevins et al. |
| 6,501,994 B1 | 12/2002 | Janke et al. |
| 6,505,082 B1 | 1/2003 | Scheiner et al. |
| 6,506,411 B2 | 1/2003 | Hunter et al. |
| 6,506,437 B1 | 1/2003 | Harish et al. |
| 6,517,515 B1 | 2/2003 | Eidenschink |
| 6,517,889 B1 | 2/2003 | Jayaraman |
| 6,521,299 B1 | 2/2003 | Dessauer |
| 6,527,863 B1 | 3/2003 | Pacetti et al. |
| 6,544,544 B2 | 4/2003 | Hunter et al. |
| 6,544,582 B1 | 4/2003 | Yoe |
| 6,545,097 B2 | 4/2003 | Pinchuk et al. |
| 6,547,787 B1 | 4/2003 | Altman et al. |
| 6,548,078 B2 | 4/2003 | Guo et al. |
| 6,555,157 B1 | 4/2003 | Hossainy |
| 6,559,560 B1 | 5/2003 | Jin et al. |
| 6,562,051 B1 | 5/2003 | Bolduc et al. |
| 6,562,136 B1 | 5/2003 | Chappa et al. |
| 6,565,659 B1 | 5/2003 | Pacetti et al. |
| 6,572,644 B1 | 6/2003 | Moein |
| 6,585,764 B2 | 7/2003 | Wright et al. |
| 6,595,958 B1 | 7/2003 | Mickley |
| 6,599,560 B1 | 7/2003 | Daggett et al. |
| 6,605,154 B1 | 8/2003 | Villareal |
| 6,607,598 B2 | 8/2003 | Schwarz et al. |
| 6,613,017 B1 | 9/2003 | Mickley |
| 6,616,765 B1 | 9/2003 | Castro et al. |
| 6,623,504 B2 | 9/2003 | Vrba et al. |
| 6,653,426 B2 | 11/2003 | Alvarado et al. |
| 6,656,529 B1 | 12/2003 | Pankake |
| 6,660,484 B2 | 12/2003 | Charych et al. |
| 6,669,980 B2 | 12/2003 | Hansen |
| 6,669,994 B2 | 12/2003 | Swan et al. |
| 6,673,154 B1 | 1/2004 | Pacetti et al. |
| 6,676,987 B2 | 1/2004 | Zhong et al. |
| 6,695,920 B1 | 2/2004 | Pacetti et al. |
| 6,706,023 B1 | 3/2004 | Huttner et al. |
| 6,706,408 B2 | 3/2004 | Jelle |
| 6,709,514 B1 | 3/2004 | Hossainy |
| 6,709,712 B2 | 3/2004 | Chappa et al. |
| 6,713,081 B2 | 3/2004 | Robinson et al. |
| 6,716,081 B2 | 4/2004 | Kim et al. |
| 6,716,196 B2 | 4/2004 | Lesh et al. |
| 6,719,750 B2 | 4/2004 | Varner et al. |
| 6,719,805 B1 | 4/2004 | Ahern |
| 6,723,373 B1* | 4/2004 | Narayanan ............... A61F 2/82 427/2.24 |
| 6,723,811 B1 | 4/2004 | Holmes et al. |
| 6,725,901 B1 | 4/2004 | Kramer et al. |
| 6,726,918 B1 | 4/2004 | Wong et al. |
| 6,743,233 B1 | 6/2004 | Baldwin et al. |
| 6,743,462 B1 | 6/2004 | Pacetti |
| 6,743,463 B2 | 6/2004 | Weber et al. |
| 6,752,959 B2 | 6/2004 | Smith et al. |
| 6,764,470 B2 | 7/2004 | Dimick |
| 6,783,793 B1 | 8/2004 | Hossainy et al. |
| 6,803,070 B2 | 10/2004 | Weber |
| 6,803,228 B1 | 10/2004 | Caillat et al. |
| 6,818,063 B1 | 11/2004 | Kerrigan |
| 6,830,814 B2 | 12/2004 | Druschke et al. |
| 6,890,583 B2 | 5/2005 | Chudzik et al. |
| 6,896,842 B1 | 5/2005 | Hamilton et al. |
| 6,933,331 B2 | 8/2005 | Yadav et al. |
| 6,941,632 B1 | 9/2005 | Mead et al. |
| 6,981,982 B2 | 1/2006 | Armstrong et al. |
| 7,008,667 B2 | 3/2006 | Chudzik et al. |
| 7,010,933 B2 | 3/2006 | Ishitomi et al. |
| 7,034,164 B1 | 4/2006 | Cosnier |
| 7,041,174 B2 | 5/2006 | Carlson et al. |
| 7,045,015 B2 | 5/2006 | Renn et al. |
| 7,077,848 B1 | 7/2006 | De Juan et al. |
| 7,077,910 B2 | 7/2006 | Chappa et al. |
| 7,087,658 B2 | 8/2006 | Swan et al. |
| 7,090,421 B1 | 8/2006 | Mead et al. |
| 7,105,350 B2 | 9/2006 | Foster et al. |
| 7,125,577 B2 | 10/2006 | Chappa |
| 7,163,523 B2 | 1/2007 | Devens, Jr. et al. |
| 7,186,374 B2 | 3/2007 | Zelina et al. |
| 7,192,484 B2 | 3/2007 | Chappa et al. |
| 7,198,675 B2 | 4/2007 | Fox et al. |
| 7,198,829 B2 | 4/2007 | Mino et al. |
| 7,226,231 B2 | 6/2007 | Py et al. |
| 7,291,693 B2 | 11/2007 | Shastri et al. |
| 7,335,314 B2 | 2/2008 | Wu |
| 7,341,759 B2 | 3/2008 | Cha et al. |
| 7,348,055 B2 | 3/2008 | Chappa et al. |
| 7,402,262 B2 | 7/2008 | Lellouche et al. |
| 7,442,402 B2 | 10/2008 | Chudzik et al. |
| 7,446,186 B2 | 11/2008 | Mandrand et al. |
| 7,512,447 B2 | 3/2009 | Marshall et al. |
| 7,541,048 B2 | 6/2009 | DeWitt et al. |
| 7,563,324 B1 | 7/2009 | Chen et al. |
| 7,608,342 B2 | 10/2009 | Zhong |
| 7,611,532 B2 | 11/2009 | Bates et al. |
| 7,638,156 B1* | 12/2009 | Hossainy ............... B05D 1/32 435/6.12 |
| 7,648,762 B2 | 1/2010 | Shin et al. |
| 7,666,326 B2 | 2/2010 | Yoshida et al. |
| 7,669,548 B2 | 3/2010 | Chappa |
| 7,695,875 B2 | 4/2010 | Touwslager et al. |
| 7,708,908 B2 | 5/2010 | Kim et al. |
| 7,736,689 B2 | 6/2010 | Chappa et al. |
| 7,737,240 B2 | 6/2010 | Marks et al. |
| 7,743,727 B2 | 6/2010 | Shekalim |
| 7,806,612 B1 | 10/2010 | Wangler |
| 7,812,180 B2 | 10/2010 | Bouchet et al. |
| 7,824,539 B2 | 11/2010 | Zhou et al. |
| 7,857,999 B2 | 12/2010 | Ohkubo et al. |
| 7,883,749 B2 | 2/2011 | Carlson |
| 7,947,836 B2 | 5/2011 | Cosnier et al. |
| 7,958,840 B2 | 6/2011 | Chappa |
| 7,989,032 B2 | 8/2011 | Louwet et al. |
| 7,998,726 B2 | 8/2011 | Roget et al. |
| 8,003,156 B2 | 8/2011 | Van Sciver |
| 8,092,661 B2 | 1/2012 | Canonne et al. |
| 8,105,745 B2 | 1/2012 | Ho et al. |
| 8,114,955 B2 | 2/2012 | Mng et al. |
| 8,166,909 B2 | 5/2012 | Chappa |
| 8,171,595 B1 | 5/2012 | Umhoefer et al. |
| 8,178,629 B2 | 5/2012 | Mather et al. |
| 8,202,833 B2 | 6/2012 | Swan et al. |
| 8,241,655 B2 | 8/2012 | Chudzik et al. |
| 8,246,974 B2 | 8/2012 | Chappa |
| 8,252,386 B2 | 8/2012 | Lee et al. |
| 8,262,592 B1 | 9/2012 | Brooks et al. |
| 8,282,981 B2 | 10/2012 | Andreacchi et al. |
| 8,318,263 B2 | 11/2012 | Carlson et al. |
| 8,343,212 B2 | 1/2013 | Knott et al. |
| D676,975 S | 2/2013 | Bickford |
| 8,378,058 B2 | 2/2013 | Travas-Sejdic et al. |
| 8,380,306 B2 | 2/2013 | Pickett et al. |
| 8,536,300 B2 | 9/2013 | Choi et al. |

(56) References Cited

U.S. PATENT DOCUMENTS

| | | |
|---|---|---|
| 8,586,702 B2 | 11/2013 | Martin et al. |
| 8,592,003 B2 | 11/2013 | Cochet et al. |
| 8,632,837 B2 | 1/2014 | Gong et al. |
| 8,757,914 B1 | 6/2014 | Megaro et al. |
| 8,844,543 B2 | 9/2014 | Bickford et al. |
| 8,889,760 B2 | 11/2014 | Kurdyumov et al. |
| 8,961,054 B2 | 2/2015 | Gilbert et al. |
| 8,974,134 B2 | 3/2015 | Wilson et al. |
| 9,205,447 B2 | 12/2015 | Wilson |
| 9,283,350 B2 | 3/2016 | Chappa et al. |
| 9,308,355 B2 | 4/2016 | Chappa et al. |
| 9,364,349 B2 | 6/2016 | Chappa et al. |
| 9,623,215 B2 | 4/2017 | Chappa et al. |
| 9,827,401 B2 | 11/2017 | Chappa et al. |
| 9,901,719 B2 | 2/2018 | Gotou et al. |
| 9,975,141 B2 | 5/2018 | Johnston et al. |
| 10,099,041 B2 | 10/2018 | Chappa et al. |
| 10,259,009 B2 | 4/2019 | Kurosaki et al. |
| 10,507,309 B2 | 12/2019 | Chappa et al. |
| 11,090,468 B2 | 8/2021 | Chappa et al. |
| 2001/0001824 A1 | 5/2001 | Wu |
| 2001/0014717 A1 | 8/2001 | Hossainy et al. |
| 2001/0022988 A1 | 9/2001 | Schwarz et al. |
| 2001/0026834 A1 | 10/2001 | Chappa et al. |
| 2001/0029351 A1 | 10/2001 | Falotico et al. |
| 2002/0005206 A1 | 1/2002 | Falotico et al. |
| 2002/0007213 A1 | 1/2002 | Falotico et al. |
| 2002/0007214 A1 | 1/2002 | Falotico |
| 2002/0007215 A1 | 1/2002 | Falotico et al. |
| 2002/0013298 A1 | 1/2002 | Hunter |
| 2002/0018795 A1 | 2/2002 | Whitbourne et al. |
| 2002/0026176 A1 | 2/2002 | Varner et al. |
| 2002/0026236 A1 | 2/2002 | Helmus et al. |
| 2002/0032434 A1 | 3/2002 | Chudzik et al. |
| 2002/0032477 A1 | 3/2002 | Helmus et al. |
| 2002/0041899 A1 | 4/2002 | Chudzik et al. |
| 2002/0046521 A1 | 4/2002 | Steinacker et al. |
| 2002/0051730 A1 | 5/2002 | Bodnar et al. |
| 2002/0054900 A1 | 5/2002 | Kamath et al. |
| 2002/0062730 A1 | 5/2002 | Thornton |
| 2002/0082679 A1 | 6/2002 | Sirhan et al. |
| 2002/0091433 A1 | 7/2002 | Ding et al. |
| 2002/0094440 A1 | 7/2002 | Llanos et al. |
| 2002/0103526 A1 | 8/2002 | Steinke |
| 2002/0107330 A1 | 8/2002 | Pinchuk et al. |
| 2002/0111590 A1 | 8/2002 | Davila et al. |
| 2002/0114823 A1 | 8/2002 | Sirhan et al. |
| 2002/0115400 A1 | 8/2002 | Skrmetta |
| 2002/0120326 A1 | 8/2002 | Michal |
| 2002/0133183 A1 | 9/2002 | Lentz et al. |
| 2002/0138048 A1 | 9/2002 | Tuch |
| 2002/0155212 A1 | 10/2002 | Hossainy |
| 2002/0159915 A1 | 10/2002 | Zelina et al. |
| 2002/0165265 A1 | 11/2002 | Hunter et al. |
| 2002/0168394 A1 | 11/2002 | Hossainy et al. |
| 2002/0188037 A1 | 12/2002 | Chudzik et al. |
| 2002/0188170 A1 | 12/2002 | Santamore et al. |
| 2002/0198511 A1 | 12/2002 | Varner et al. |
| 2003/0003221 A1 | 1/2003 | Zhong et al. |
| 2003/0004209 A1 | 1/2003 | Hunter et al. |
| 2003/0014036 A1 | 1/2003 | Varner et al. |
| 2003/0021828 A1 | 1/2003 | Guo et al. |
| 2003/0031780 A1 | 2/2003 | Chudzik et al. |
| 2003/0039689 A1 | 2/2003 | Chen et al. |
| 2003/0044514 A1 | 3/2003 | Richard |
| 2003/0054023 A1 | 3/2003 | Hughes et al. |
| 2003/0054090 A1 | 3/2003 | Hansen |
| 2003/0059520 A1 | 3/2003 | Chen et al. |
| 2003/0059920 A1 | 3/2003 | Drohan et al. |
| 2003/0060783 A1 | 3/2003 | Koole et al. |
| 2003/0065332 A1 | 4/2003 | TenHuisen et al. |
| 2003/0083646 A1 | 5/2003 | Sirhan et al. |
| 2003/0088307 A1 | 5/2003 | Shulze et al. |
| 2003/0094736 A1 | 5/2003 | Qin et al. |
| 2003/0096131 A1 | 5/2003 | Beavers |
| 2003/0099684 A1 | 5/2003 | Domb et al. |
| 2003/0099845 A1 | 5/2003 | Ogawa et al. |
| 2003/0113439 A1 | 6/2003 | Pacetti et al. |
| 2003/0120200 A1 | 6/2003 | Bergheim et al. |
| 2003/0129130 A1 | 7/2003 | Guire et al. |
| 2003/0139801 A1* | 7/2003 | Sirhan .................. A61F 2/91 623/1.42 |
| 2003/0143315 A1 | 7/2003 | Pui et al. |
| 2003/0150380 A1 | 8/2003 | Yoe |
| 2003/0152693 A1 | 8/2003 | Su et al. |
| 2003/0157187 A1 | 8/2003 | Hunter |
| 2003/0157241 A1 | 8/2003 | Hossainy et al. |
| 2003/0158598 A1 | 8/2003 | Ashton et al. |
| 2003/0161937 A1 | 8/2003 | Leiby et al. |
| 2003/0165613 A1 | 9/2003 | Chappa et al. |
| 2003/0175324 A1 | 9/2003 | Robinson et al. |
| 2003/0181848 A1 | 9/2003 | Bergheim et al. |
| 2003/0190420 A1 | 10/2003 | Chappa et al. |
| 2003/0207856 A1 | 11/2003 | Tremble et al. |
| 2003/0215564 A1* | 11/2003 | Heller .................. B05D 1/005 118/57 |
| 2003/0229333 A1 | 12/2003 | Ashton et al. |
| 2003/0232087 A1 | 12/2003 | Lawin et al. |
| 2003/0232122 A1 | 12/2003 | Chappa et al. |
| 2003/0236513 A1 | 12/2003 | Schwarz et al. |
| 2003/0236514 A1 | 12/2003 | Schwarz |
| 2004/0006146 A1 | 1/2004 | Evans et al. |
| 2004/0022853 A1 | 2/2004 | Ashton et al. |
| 2004/0034357 A1 | 2/2004 | Beane et al. |
| 2004/0037886 A1 | 2/2004 | Hsu |
| 2004/0044404 A1 | 3/2004 | Stucke et al. |
| 2004/0047911 A1 | 3/2004 | Lyu et al. |
| 2004/0062592 A1 | 4/2004 | Shekalim et al. |
| 2004/0062875 A1 | 4/2004 | Chappa et al. |
| 2004/0073298 A1 | 4/2004 | Hossainy |
| 2004/0081745 A1 | 4/2004 | Hansen |
| 2004/0111818 A1 | 6/2004 | Ma |
| 2004/0121014 A1 | 6/2004 | Guo et al. |
| 2004/0133155 A1 | 7/2004 | Varner et al. |
| 2004/0137059 A1 | 7/2004 | Nivaggioli et al. |
| 2004/0142013 A1 | 7/2004 | Rubsamen |
| 2004/0143314 A1 | 7/2004 | Sommer et al. |
| 2004/0161547 A1 | 8/2004 | Carlson et al. |
| 2004/0185168 A1 | 9/2004 | Weber et al. |
| 2004/0194704 A1 | 10/2004 | Chappa et al. |
| 2004/0202774 A1 | 10/2004 | Chudzik et al. |
| 2004/0203075 A1 | 10/2004 | Chudzik et al. |
| 2004/0209252 A1 | 10/2004 | Garnier et al. |
| 2004/0211362 A1 | 10/2004 | Castro et al. |
| 2004/0213893 A1 | 10/2004 | Boulais |
| 2004/0220841 A1 | 11/2004 | Fairweather |
| 2005/0008860 A1 | 1/2005 | Garnier et al. |
| 2005/0015142 A1 | 1/2005 | Austin et al. |
| 2005/0019371 A1 | 1/2005 | Anderson et al. |
| 2005/0056814 A1 | 3/2005 | Garnier et al. |
| 2005/0059956 A1 | 3/2005 | Varner et al. |
| 2005/0060015 A1 | 3/2005 | Tanaka |
| 2005/0098097 A1 | 5/2005 | Chen et al. |
| 2005/0124724 A1 | 6/2005 | Burton et al. |
| 2005/0129732 A1 | 6/2005 | Rubsamen |
| 2005/0142070 A1 | 6/2005 | Hartley |
| 2005/0143363 A1 | 6/2005 | De Juan et al. |
| 2005/0147690 A1 | 7/2005 | Masters et al. |
| 2005/0158449 A1 | 7/2005 | Chappa |
| 2005/0196518 A1 | 9/2005 | Stenzel et al. |
| 2005/0220839 A1 | 10/2005 | DeWitt et al. |
| 2005/0220840 A1 | 10/2005 | DeWitt et al. |
| 2005/0220842 A1 | 10/2005 | DeWitt et al. |
| 2005/0220843 A1 | 10/2005 | DeWitt et al. |
| 2005/0233061 A1 | 10/2005 | Schwarz et al. |
| 2005/0233062 A1 | 10/2005 | Hossainy et al. |
| 2005/0240147 A1 | 10/2005 | Makower et al. |
| 2005/0244459 A1 | 11/2005 | DeWitt et al. |
| 2005/0255142 A1 | 11/2005 | Chudzik et al. |
| 2005/0260246 A1 | 11/2005 | Chudzik et al. |
| 2005/0271703 A1 | 12/2005 | Anderson et al. |
| 2005/0271706 A1 | 12/2005 | Anderson et al. |
| 2005/0276837 A1 | 12/2005 | Anderson et al. |
| 2005/0281863 A1 | 12/2005 | Anderson et al. |

(56) References Cited

U.S. PATENT DOCUMENTS

| | | |
|---|---|---|
| 2005/0287188 A1 | 12/2005 | Anderson et al. |
| 2006/0013850 A1 | 1/2006 | Domb et al. |
| 2006/0020295 A1 | 1/2006 | Brockway et al. |
| 2006/0029720 A1 | 2/2006 | Panos et al. |
| 2006/0045981 A1 | 3/2006 | Tsushi et al. |
| 2006/0059520 A1 | 3/2006 | Miyazawa et al. |
| 2006/0064134 A1 | 3/2006 | Mazar et al. |
| 2006/0064142 A1 | 3/2006 | Chavan et al. |
| 2006/0074404 A1 | 4/2006 | Struble |
| 2006/0083772 A1 | 4/2006 | DeWitt et al. |
| 2006/0088653 A1 | 4/2006 | Chappa |
| 2006/0096535 A1 | 5/2006 | Haller et al. |
| 2006/0110428 A1 | 5/2006 | De Juan et al. |
| 2006/0111754 A1 | 5/2006 | Rezai et al. |
| 2006/0116590 A1 | 6/2006 | Fayram et al. |
| 2006/0165872 A1 | 7/2006 | Chappa et al. |
| 2006/0175193 A1 | 8/2006 | Inganas et al. |
| 2006/0191476 A1 | 8/2006 | Nagase et al. |
| 2006/0241734 A1 | 10/2006 | Marshall et al. |
| 2006/0269663 A1 | 11/2006 | Mori et al. |
| 2006/0270924 A1 | 11/2006 | Kruger et al. |
| 2007/0031178 A1 | 2/2007 | Massimi |
| 2007/0060815 A1 | 3/2007 | Martin et al. |
| 2007/0065481 A1 | 3/2007 | Chudzik et al. |
| 2007/0101933 A1 | 5/2007 | Chappa |
| 2007/0116855 A1 | 5/2007 | Fox et al. |
| 2007/0131165 A1 | 6/2007 | Fox et al. |
| 2007/0141232 A1 | 6/2007 | Tochterman et al. |
| 2007/0259100 A1 | 11/2007 | Guerriero et al. |
| 2007/0259102 A1 | 11/2007 | McNiven et al. |
| 2007/0259125 A1 | 11/2007 | O'Brien et al. |
| 2007/0275175 A1 | 11/2007 | Hossainy |
| 2008/0149025 A1 | 6/2008 | Swenson |
| 2008/0179781 A1 | 7/2008 | Iwata |
| 2008/0274266 A1 | 11/2008 | Davis et al. |
| 2008/0277631 A1 | 11/2008 | Smela |
| 2008/0292778 A1 | 11/2008 | Tarcha et al. |
| 2008/0299030 A1 | 12/2008 | Rinzler et al. |
| 2009/0012446 A1 | 1/2009 | Cui et al. |
| 2009/0018643 A1 | 1/2009 | Hashi et al. |
| 2009/0054837 A1 | 2/2009 | Von Holst et al. |
| 2009/0084311 A1 | 4/2009 | Yoshida et al. |
| 2009/0090299 A1 | 4/2009 | Menendez et al. |
| 2009/0095624 A1 | 4/2009 | Garnier et al. |
| 2009/0117268 A1 | 5/2009 | Lewis et al. |
| 2009/0176030 A1 | 7/2009 | Carlson et al. |
| 2009/0232867 A1 | 9/2009 | Domb et al. |
| 2009/0236229 A1 | 9/2009 | Advincula et al. |
| 2009/0269481 A1 | 10/2009 | Chappa et al. |
| 2009/0317537 A1 | 12/2009 | Andreacchi |
| 2010/0032090 A1 | 2/2010 | Myung et al. |
| 2010/0040766 A1 | 2/2010 | Chappa et al. |
| 2010/0055294 A1 | 3/2010 | Wang et al. |
| 2010/0070020 A1 | 3/2010 | Hashi et al. |
| 2010/0179475 A1 | 7/2010 | Hoffmann et al. |
| 2010/0227044 A1 | 9/2010 | Scheer |
| 2010/0272774 A1 | 10/2010 | Chappa |
| 2010/0319183 A1 | 12/2010 | Hulseman et al. |
| 2011/0021899 A1 | 1/2011 | Arps |
| 2011/0046724 A1 | 2/2011 | Heilmann et al. |
| 2011/0087315 A1 | 4/2011 | Richardson-Burns et al. |
| 2011/0104392 A1 | 5/2011 | Carlson et al. |
| 2011/0111350 A1 | 5/2011 | Lakshmi et al. |
| 2011/0151199 A1 | 6/2011 | Nelson et al. |
| 2011/0155962 A1 | 6/2011 | Choi et al. |
| 2011/0159249 A1 | 6/2011 | Choi et al. |
| 2011/0174629 A1 | 7/2011 | Bouchet et al. |
| 2011/0238011 A1 | 9/2011 | Scheller et al. |
| 2011/0250008 A1 | 10/2011 | Lim |
| 2011/0253170 A1 | 10/2011 | Clark et al. |
| 2011/0281019 A1 | 11/2011 | Gong et al. |
| 2011/0281020 A1 | 11/2011 | Gong et al. |
| 2011/0290315 A1 | 12/2011 | Levon et al. |
| 2011/0311713 A1 | 12/2011 | O'Neill et al. |
| 2011/0311764 A1 | 12/2011 | Hulseman et al. |
| 2012/0015146 A1 | 1/2012 | Advincula et al. |
| 2012/0028191 A1 | 2/2012 | Qin et al. |
| 2012/0043693 A1 | 2/2012 | King et al. |
| 2012/0046384 A2 | 2/2012 | Kurdyumov et al. |
| 2012/0059317 A1 | 3/2012 | Michiyo et al. |
| 2012/0088118 A1 | 4/2012 | Lomasney et al. |
| 2012/0100217 A1 | 4/2012 | Green et al. |
| 2012/0100279 A1 | 4/2012 | Neumann et al. |
| 2012/0178893 A1 | 7/2012 | Martin et al. |
| 2012/0202072 A1 | 8/2012 | Asai et al. |
| 2012/0244294 A1 | 9/2012 | Ho et al. |
| 2012/0258246 A1 | 10/2012 | Saine et al. |
| 2012/0263922 A1 | 10/2012 | Advincula et al. |
| 2012/0315376 A1 | 12/2012 | Nguyen et al. |
| 2013/0056020 A1 | 3/2013 | Wilson et al. |
| 2013/0337147 A1 | 12/2013 | Chappa et al. |
| 2013/0340192 A1 | 12/2013 | Decarr et al. |
| 2014/0121597 A1 | 5/2014 | Chappa et al. |
| 2014/0153996 A1 | 6/2014 | Ammerman |
| 2014/0161964 A1 | 6/2014 | Chappa et al. |
| 2014/0200411 A1 | 7/2014 | Jelle et al. |
| 2014/0328998 A1 | 11/2014 | Chappa et al. |
| 2015/0017429 A1 | 1/2015 | Li et al. |
| 2015/0034488 A1 | 2/2015 | Kurdyumov |
| 2015/0044376 A1 | 2/2015 | Topf et al. |
| 2016/0256668 A1 | 9/2016 | Chappa et al. |
| 2016/0271644 A1 | 9/2016 | Weinmann et al. |
| 2017/0341104 A1 | 11/2017 | Johnston et al. |
| 2018/0036519 A1 | 2/2018 | Chappa et al. |
| 2018/0110903 A1 | 4/2018 | Slager et al. |
| 2019/0099778 A1 | 4/2019 | Antoniazzi |
| 2019/0143661 A1 | 5/2019 | Hunt et al. |
| 2019/0151629 A1 | 5/2019 | Chappa et al. |

FOREIGN PATENT DOCUMENTS

| | | |
|---|---|---|
| CR | 3954 | 7/2020 |
| DE | 3335502 | 3/1985 |
| DE | 20200223 | 4/2002 |
| DE | 10053826 | 5/2002 |
| EP | 0096433 | 12/1983 |
| EP | 0144873 | 6/1985 |
| EP | 0348765 | 1/1990 |
| EP | 0414233 | 2/1991 |
| EP | 0604022 | 6/1994 |
| EP | 0623354 | 11/1994 |
| EP | 0716836 | 6/1996 |
| EP | 0734721 | 10/1996 |
| EP | 0747069 | 12/1996 |
| EP | 0857516 | 2/1998 |
| EP | 0832655 | 4/1998 |
| EP | 0834282 | 4/1998 |
| EP | 0945148 | 9/1999 |
| EP | 1138048 | 10/2001 |
| EP | 1218098 | 7/2002 |
| EP | 0879595 | 1/2003 |
| EP | 1374924 | 1/2004 |
| EP | 1382302 | 1/2004 |
| EP | 1381058 | 11/2006 |
| EP | 1594623 | 4/2007 |
| EP | 0923953 | 8/2008 |
| EP | 1610836 | 8/2008 |
| EP | 2994241 | 7/2019 |
| EP | 2855030 | 8/2019 |
| EP | 3549679 | 10/2019 |
| EP | 2911804 | 7/2020 |
| FR | 1304457 | 8/1962 |
| FR | 2733163 | 10/1996 |
| GB | 525373 | 8/1940 |
| GB | 757659 | 9/1956 |
| GB | 2301296 | 12/1996 |
| GB | 104464 | 4/2001 |
| JP | 57048354 | 3/1982 |
| JP | 63-011547 | 1/1988 |
| JP | 02-036882 | 2/1990 |
| JP | H0262550 | 3/1990 |
| JP | H03021367 | 1/1991 |
| JP | H0924317 | 1/1997 |
| JP | 09-038546 | 2/1997 |

(56) References Cited

FOREIGN PATENT DOCUMENTS

| | | |
|---|---|---|
| JP | 09-194347 | 7/1997 |
| JP | 2003039015 | 2/2003 |
| JP | 2005059225 | 3/2005 |
| JP | 06-246207 | 9/2006 |
| JP | 08-086466 | 4/2008 |
| JP | 2010516307 | 5/2010 |
| JP | 2015527092 | 9/2015 |
| JP | 2016504058 | 2/2016 |
| JP | 2016525924 | 9/2016 |
| JP | 6445532 | 12/2018 |
| JP | 6549482 | 7/2019 |
| JP | 6688609 | 4/2020 |
| WO | 1989005664 | 6/1989 |
| WO | 1991012779 | 9/1991 |
| WO | 1992011895 | 7/1992 |
| WO | 1992015286 | 9/1992 |
| WO | 1993000174 | 1/1993 |
| WO | 1993015682 | 8/1993 |
| WO | 1994021308 | 9/1994 |
| WO | 1994021309 | 9/1994 |
| WO | 9500882 | 1/1995 |
| WO | 1995003036 | 2/1995 |
| WO | 1997010011 | 3/1997 |
| WO | 1997037640 | 11/1997 |
| WO | 1998017331 | 4/1998 |
| WO | 1998032474 | 7/1998 |
| WO | 1999001114 | 1/1999 |
| WO | 1998058690 | 3/1999 |
| WO | 1999036071 | 7/1999 |
| WO | 1999038546 | 8/1999 |
| WO | 1999055396 | 11/1999 |
| WO | 2000001322 | 1/2000 |
| WO | 2000002564 | 1/2000 |
| WO | 2000012163 | 3/2000 |
| WO | 2000021584 | 4/2000 |
| WO | 0031750 | 6/2000 |
| WO | 0077523 | 12/2000 |
| WO | 0117670 | 3/2001 |
| WO | 2001021326 | 3/2001 |
| WO | 2001032382 | 5/2001 |
| WO | 2001078626 | 10/2001 |
| WO | 2001094103 | 12/2001 |
| WO | 2002009786 | 2/2002 |
| WO | 2002020174 | 3/2002 |
| WO | 0233732 | 4/2002 |
| WO | 2003004072 | 1/2003 |
| WO | 2003024615 | 3/2003 |
| WO | 2004028579 | 4/2004 |
| WO | 2004028699 | 4/2004 |
| WO | 2004037126 | 5/2004 |
| WO | 2004037443 | 5/2004 |
| WO | 2004073885 | 9/2004 |
| WO | 2004091682 | 10/2004 |
| WO | 2004098565 | 11/2004 |
| WO | 2005009297 | 2/2005 |
| WO | 2006018643 | 2/2006 |
| WO | 2006080639 | 8/2006 |
| WO | 2006110366 | 10/2006 |
| WO | 2007059144 | 5/2007 |
| WO | 2007061559 | 5/2007 |
| WO | 2007100801 | 9/2007 |
| WO | 2008002357 | 1/2008 |
| WO | 2008130326 | 10/2008 |
| WO | 2009054814 | 4/2009 |
| WO | 2009132214 | 10/2009 |
| WO | 2010024898 | 3/2010 |
| WO | 2010146096 | 12/2010 |
| WO | 2011048419 | 4/2011 |
| WO | 2013109930 | 7/2013 |
| WO | 2013181498 | 12/2013 |
| WO | 2014066760 | 5/2014 |
| WO | 2014110407 | 7/2014 |
| WO | 2014182833 | 11/2014 |
| WO | 2015031265 | 3/2015 |

OTHER PUBLICATIONS

File History for U.S. Appl. No. 10/371,043 downloaded Feb. 4, 2022 (232 pages).
File History for U.S. Appl. No. 12/980,920 downloaded Feb. 4, 2022 (192 pages).
File History for U.S. Appl. No. 11/375,487 downloaded Feb. 4, 2022 (300 pages).
File History for European Patent Application No. 04759211.8 downloaded Feb. 4, 2022 (212 pages).
File History for U.S. Appl. No. 10/409,434 downloaded Feb. 4, 2022 (199 pages).
File History for U.S. Appl. No. 11/421,637 downloaded Feb. 4, 2022 (193 pages).
File History for European Patent Application No. 05821170.7 downloaded Feb. 4, 2022 (320 pages).
File History for U.S. Appl. No. 11/539,443 downloaded Feb. 4, 2022 (269 pages).
File History for U.S. Appl. No. 10/976,348 downloaded Feb. 4, 2022 (313 pages).
File History for U.S. Appl. No. 11/823,055 downloaded Feb. 4, 2022 (154 pages).
File History for U.S. Appl. No. 10/976,193 downloaded Feb. 4, 2022 (479 pages).
File History for European Patent Application No. 05822667.1 downloaded Feb. 4, 2022 (230 pages).
File History for European Patent Application No. 06740366.7 downloaded Feb. 4, 2022 (312 pages).
File History for U.S. Appl. No. 11/102,465 downloaded Feb. 4, 2022 (497 pages).
File History for U.S. Appl. No. 11/559,817 downloaded Feb. 4, 2022 (302 pages).
File History for European Patent Application No. 09735529.1 downloaded Feb. 4, 2022 (154 pages).
File History for U.S. Appl. No. 12/109,139 downloaded Feb. 4, 2022 (291 pages).
File History for U.S. Appl. No. 12/831,539 downloaded Feb. 4, 2022 (237 pages).
File History for European Patent Application No. 19174997.7 downloaded Feb. 4, 2022 (322 pages).
File History for European Patent Application No. 14730319.2 downloaded Feb. 4, 2022 (462 pages).
File History for European Patent Application No. 13729853.5 downloaded Feb. 4, 2022 (303 pages).
File History for U.S. Appl. No. 15/783,554 downloaded Feb. 4, 2022 (247 pages).
File History for U.S. Appl. No. 16/160,425 downloaded Feb. 4, 2022 (222 pages).
File History for U.S. Appl. No. 15/061,234 downloaded Feb. 3, 2022 (224 pages).
File History for U.S. Appl. No. 14/272,204 downloaded Feb. 4, 2022 (302 pages).
File History for U.S. Appl. No. 13/906,599 downloaded Feb. 4, 2022 (249 pages).
File History for European Patent Application No. 13792526.9 downloaded Feb. 4, 2022 (403 pages).
File History for U.S. Appl. No. 14/063,113 downloaded Feb. 4, 2022 (654 pages).
File History for U.S. Appl. No. 14/063,124 downloaded Feb. 4, 2022 (175 pages).
File History for U.S. Appl. No. 14/152,667 downloaded Feb. 4, 2022 (205 pages).
File History for U.S. Appl. No. 14/448,606 downloaded Feb. 4, 2022 (108 pages).
"Cross-Link," http://en.wikipedia.org/wiki/Cross-link; retrieved Nov. 6, 2009 (4 pages).
"Final Office Action," for Japanese Application No. 2006-509776, mailed Jul. 5, 2011, (10 pages) with English Translation.
"Final Office Action," for Japanese Patent Application No. 2015-539837 mailed Oct. 1, 2018 (7 pages) with English Translation.
"Final Rejection," for Japanese Patent Application No. 2015-515223 mailed Nov. 22, 2017 (8 pages) with English translation.

(56) References Cited

OTHER PUBLICATIONS

"First Office Action," for CA Application No. 2604832, mailed Mar. 16, 2012 (4 pages).
"First Office Action," for Japanese patent Application No. 2006-503609, mailed Mar. 30, 2010 (7 pages) with English translation.
"International Preliminary Report on Patentability," for International Application No. PCT/US2005/038628 mailed May 10, 2007 (10 pages).
"International Preliminary Report on Patentability," For PCT Application No. PCT/US2013/043547, mailed on Dec. 11, 2014 (7 pages).
"International Preliminary Report on Patentability," for PCT/US2013/066810, mailed May 7, 2015 (12 pages).
"International Preliminary Report on Patentability," for PCT/US2014/011096 mailed Jul. 24, 2015 (13 pages).
"International Preliminary Report on Patentability," for PCT/US2014/037179 mailed Nov. 19, 2015 (9 pages).
"International Preliminary Report on Patentability," from International Application No. PCT/US2004/004486, mailed Aug. 19, 2005, (6 pages).
"International Search Report & Written Opinion," for PCT/US2004/010692, mailed Jul. 23, 2004 (9 pages).
"International Search Report and Written Opinion," For International Application No. PCT/US2005/038628 mailed Mar. 22, 2006 (16 pages).
"International Search Report and Written Opinion," For PCT Application No. PCT/US2014/037179 mailed Feb. 19, 2015 (15 pages).
"International Search Report and Written Opinion," for PCT/US2006/044218, mailed Mar. 22, 2007 (12 pages).
"International Search Report and Written Opinion," for PCT/US2009/041575, mailed Jul. 22, 2009 (15 pages).
"International Search Report and Written Opinion," for PCT/US2013/043547, mailed Oct. 1, 2013 (10 pages).
"International Search Report and Written Opinion," for PCT/US2013/066810, mailed Apr. 17, 2014 (18 pages).
"International Search Report and Written Opinion," for PCT/US2014/011096, mailed Jul. 22, 2014 (22 pages).
"International Search Report and Written Opinion," for PCT/US2014/052542, mailed Jan. 7, 2015 (11 pages).
"International Search Report," for PCT/US2004/004486, mailed Jul. 19, 2004 (8 pages).
"Invitation to Pay Additional Fees and, Where Applicable, Protest Fee," for PCT/US2013/066810, mailed Feb. 7, 2014 (6 pages).
"Invitation to Pay Additional Fees," For PCT Application No. PCT/US2014/037179, mailed on Oct. 24, 2014 (5 pages).
"Invitation to Pay Additional Fees," for PCT/US2014/011096, mailed Mar. 27, 2014 (10 pages).
"Office Action Response," for Canadian Patent Application No. 2,889,062 filed Jun. 1, 2021 (14 pages).
"Office Action Response," for Canadian Patent Application No. 2,889,062 filed Mar. 9, 2020 (18 pages).
"Office Action Response," for Canadian Patent Application No. 2,889,062 filed Sep. 18, 2020 (11 pages).
"Office Action," for Canadian Patent Application No. 2,874,824 mailed Apr. 11, 2019 (5 pages).
"Office Action," for Canadian Patent Application No. 2,874,824 mailed Aug. 25, 2020 (3 pages).
"Office Action," for Canadian Patent Application No. 2,874,824 mailed Jan. 9, 2020 (4 pages).
"Office Action," for Canadian Patent Application No. 2,889,062 mailed Aug. 6, 2021 (3 pages).
"Office Action," for Canadian Patent Application No. 2,889,062 mailed Feb. 9, 2021 (3 pages).
"Office Action," for Canadian Patent Application No. 2,889,062 mailed Jun. 5, 2020 (3 pages).
"Office Action," for Canadian Patent Application No. 2,889,062 mailed Sep. 12, 2019 (3 pages).
"Office Action," for Canadian Patent Application No. 2,900,482 mailed Aug. 16, 2021 (3 pages).
"Office Action," for Canadian Patent Application No. 2,911,482 mailed Jul. 17, 2020 (3 pages).
"Office Action," for Canadian Patent Application No. 2,911,482 mailed Mar. 10, 2021 (3 pages).
"Office Action," for Canadian Patent Application No. 2,911,482 mailed Jan. 25, 2022 (3 pages).
"Office Action," for Japanese Patent Application No. 2015-515223 mailed Feb. 21, 2019 (5 pages) with English Translation.
"Office Action," for Japanese Patent Application No. 2015-515223 mailed Mar. 24, 2017 (10 pages) with English translation.
"Office Action," for Japanese Patent Application No. 2015-539837 mailed Aug. 31, 2017 (11 pages) with English translation.
"Office Action," for Japanese Patent Application No. 2015-539837 mailed Jun. 28, 2018 (7 pages) with English translation.
"Office Action," for Japanese Patent Application No. 2016-513047 mailed Mar. 6, 2018 (11 pages) with English translation.
"Office Action," for Mexican Patent Application No. MX/a/2014/014574 mailed Jun. 15, 2017 (1 page), English summary.
"PolyIsoprene (Synthetic)," Encyclopedia of Chemical Technology, vol. 8 (1993), 3 pages.
"Pre-Appeal Examination Report," for Japanese Patent Application No. 2015-539837 dated Mar. 8, 2019 (5 pages), with English Translation.
"Preliminary Report on Patentability," for PCT/US2014/052542) mailed Mar. 10, 2016 (10 pages).
"Response to Examination Report," for Canadian Patent Application No. 2,900,482 filed Nov. 10, 2021 (11 pages).
"Response to Office Action," for Canadian Patent Application No. 2,874,824 filed May 8, 2020 (15 pages).
"Response to Office Action," for Canadian Patent Application No. 2,874,824 filed Nov. 4, 2020 (6 pages).
"Response to Office Action," for Canadian Patent Application No. 2,874,824 filed Oct. 7, 2019 (18 pages).
"Response to Office Action," for Canadian Patent Application No. 2,889,062 filed Sep. 21, 2021 (3 pages).
"Response to Office Action," for Canadian Patent Application No. 2,911,482 filed Apr. 6, 2021 (4 pages).
"Response to Office Action," for Canadian Patent Application No. 2,911,482 filed Oct. 28, 2020 (10 pages).
"STIC Structure Search," U.S. Appl. No. 14/152,667 on Aug. 1, 2017 (164 pages).
"Ultrasonic Spray Nozzle Systems," SONO-TEK Corporation Brochure, 2005 (16 pages).
Abidian, Mohammad Reza, et al. "Conducting-Polymer Nanotubes for Controlled Drug Release," Advanced Materials, 18, (2006), pp. 405-409.
Adamne, A. M, et al. "Effect of Multiwall Nanotube on the Properties of Polypropylenes," Kecskemet College, Institute of Metal and Polymer Technology—Kecskemet, Izsaki u. 10., H-6000, Hungary (2004, 4 pages.
Application "Biocompatible Polymerization Accelerators," U.S. Appl. No. 10/723,505, filed Nov. 26, 2003 In The Name Of Dale G. Swan et al., 2005, 38 pages.
Atias, Danit, et al. "Poly(methyl metacrylate) Conductive Fiber Optic Transducers as Dual Biosensor Patforms," Biosensors and Bioelectronics, vol. 24, No. 12, 2009, pp. 3683-3687.
Babapulle, Mohan N., et al. "Coated Stents for the Prevention of Restenosis: Part II," Circulation, 106, (2002), pp. 2858-2866.
Braun, Dietrich "Plastics," Concise Encyclopedia of Polymer Science and Engineering, 1990 (pp. 461-464).
Di Mario, et al. "Radioactive Stents—A Dead End?," Current Interventional Cardiology Reports, 2000 (2 pages).
Frontana-Uribe, Bernardo A., et al. "Electrochemistry of Conducting Polymers—Persistent Models and New Concepts," Chemical Reviews 2010, 110. pp. 4724-4771 (49 pages).
Hiemenz, Paul "Polymer Chemistry: The Basic Concepts," CRC Press, 1984 (pp. 9 and 12).
Hodko, Dalibor, et al. "Photopolymerized Silver-Containing Conducting Polymer Films. Part. 1. An Electronic conductivity and Cyclic Voltammetric Investigation," Journal of Solid State Electrochemistry, vol. 13, No. 7, pp. 1063-1075.

(56) References Cited

OTHER PUBLICATIONS

Konry, T., et al. "ITO Pattern Fabrication of Glass Platforms for Electropolymerization of Light Sensitive Polymer for its Conjugation to Bioreceptors on a Micro-Array," Talanta, vol. 75, No. 2, pp. 564-571.

Nilasaroya, A., et al. "Structural and Functional Characterisation of Poly(vinyl alcohol) and Heparin Hydrogels," Biomaterials, vol. 29, No. 35, (2008) pp. 4658-4664.

Noel, S., et al. "Influence of Grafting Properties of Organic Thin Films for Low Level Electrical Contacts Protection," Electrical Contacts, 2008, pp. 249-257.

Tamburri, Emanuela, et al. "Growth Mechanisms, Morphology, and Electroactivity of PEDOT Layers Produced by Electrochemical Routes in Aqueous Medium," Synthetic Metals, 159, 2009, p. 406-414 (9 pages).

Tsai, Lin-Ren, et al. "Hyperbranched and Thermally Cross-Linkable Oligomer from a New 2,5,7-Tri-Functional Fluorene Monomer," Journal of Polymer Science Part A: Polymer Chemistry, vol. 46, No. 1, 2008, pp. 70-84.

Virkar, Ajay, et al. "Oligothiophene Based Organic Semiconductors with Cross-Linkable Benzophenone Moieties," Synthetic Metals, vol. 158, No. 21-24, 2008, pp. 958-963.

Wang, Xi-Shu, et al. "Investigations on the Mechanical Properties of Conducting Polymer Coating-Substrate Structures and Their Influencing Factors," Int. J. Mol. Sci. (2009), 10, pp. 5257-5284.

Wen, Lu, et al. "Enzymatic Sensor Based on Conducting Polymer Coatings on Metallised Membranes," Analytical Communications, vol. 35, (1998), pp. 245-248.

Wu, Man, et al. "Abstract of Electrical and Mechanical Behaviors of Carbon Nanotube-filled Polymer Blends," J Appl Polym Sci 99, (2006), pp. 477-488 (1 page).

Yang, Chunhe, et al. "Electroluminescent and Photovoltaic Properties of the Crosslinkable Poly(phenylene vinylene) Derivative with Side Chains Containing Vinyl Groups," Macromolecular Chemistry and Physics, vol. 206, No. 13, 2005, pp. 1311-1318.

Yeo, Yoon "A New Microencapsulation Method Using an Ultrasonic Atomizer Based on Interfacial Solvent Exchange," Journal of Controlled Release 100 (2004) pp. 379-388.

"Communication Pursuant to Article 94(3) EPC," for European Patent Application No. 19174997.7 mailed Jul. 24, 2023 (4 pages).

"Response to Communication Pursuant to Article 94(3) EPC," for European Patent Application No. 19174997.7 filed Nov. 30, 2023 (19 pages).

* cited by examiner

COATING APPLICATION SYSTEM AND METHODS FOR COATING ROTATABLE MEDICAL DEVICES

This application claims the benefit of U.S. Provisional Application No. 63/135,279, filed Jan. 8, 2021, the content of which is herein incorporated by reference in its entirety.

FIELD

Embodiments herein relate to a system for coating rotatable medical devices.

BACKGROUND

Functional improvements to implantable or insertable medical devices can be achieved by coating the surface of the device. For example, a coating formed on the surface of the device can provide improved lubricity, improved biocompatibility, or drug delivery properties to the surface. In turn, this can improve movement of the device in the body, extend the functional life of the device, or treat a medical condition near the site of implantation. However, various challenges exist for the design and use of coating apparatus designed to provide coatings to medical devices.

Traditional coating methods, such as dip coating, are often undesirable as they may result in flawed coatings that could compromise the function of the device or present problems during use. These methods can also result in coating inaccuracies, which can be manifested in variable amounts of the coated material being deposited on the surface of the device. When a drug is included in the coating material, it is often necessary to deliver precise amounts of the agent to the surface of the device to ensure that a subject receiving the coated device receives a proper dose of the agent. It has been difficult to achieve a great degree of accuracy using traditional coating methods and machines.

SUMMARY

Embodiments herein relate to a system for coating rotatable medical devices and related methods. In an embodiment, a coating system for coating rotatable medical devices is included having a rotation mechanism, wherein the rotation mechanism is configured to mount and rotate a rotatable medical device. The coating system also includes a fluid applicator unit. The fluid applicator unit can include a rotating retention sleeve. The rotating retention sleeve can define a channel into which the rotatable medical device or a component thereof fits during a coating operation.

In an embodiment, a method of coating a rotatable medical device is included. The method can include fitting the rotatable medical device within a rotating retention sleeve of a fluid applicator unit. The method can also include rotating the rotatable medical device with a rotation mechanism. The method can also include rotating the rotating retention sleeve at a speed matching the rotation speed of the rotatable medical device. The method can also include moving a fluid applicator tip and the rotating retention sleeve together relative to a lengthwise axis of the rotatable medical device. The method can also include applying a coating solution onto a surface of the rotatable medical device using the fluid applicator tip, wherein an outside diameter of a component of the rotatable medical device to be coated matches an inside diameter of a channel of the rotating retention sleeve.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

Coatings are frequently applied onto the surfaces of various medical devices including, but not limited to, catheters and particularly balloon catheters. It is typically desirable for such coatings to be as uniform as possible in terms of thickness, composition, and the like. However, in some cases, a rollable (or rotatable) medical device may wobble as it is being rotated during the coating process. For example, catheters generally exhibit significant longitudinal flexibility that is consistent with their intended use. However, when rotated around their lengthwise axis, this can result in a noticeable wobble. This wobble can create challenges for forming a uniform coating. For example, in the context of a coating process that includes a direct contact or near-contact coating applicator the wobble can result in variation of the coating applicator with respect to the surface of the medical device being coated leading to non-uniform coatings being deposited.

However, embodiments herein can be used to apply uniform coatings, such as coatings including active agents, onto various medical devices, such as onto the balloons of drug coated or drug eluting balloon catheters. In specific, embodiments herein can minimize the amount of wobble that a medical device may exhibit while being rotated during a coating application process promoting the application of a uniform coating layer thereon. Minimizing the amount of wobble can be valuable in many coating scenarios but can be particularly valuable in the case of coating systems utilizing a direct contact coating tip.

In various embodiments, wobble can be reduced or eliminated through the use of a rotating retention sleeve, which can rotate at a speed approximating the speed of rotation of the rotating medical device (by virtue of being driven at that speed or freely rotating under the influence of the rotatable medical device). Because the rotating retention sleeve can rotate at approximately the same speed as the rotatable medical device, the amount of friction and other forces between the rotating retention sleeve and the rotatable medical device can be minimized to prevent any inadvertent damage to the rotatable medical device and portions thereof such as a balloon as well as limiting the inadvertent creation of particulates that may otherwise be formed through frictional wear.

Figure 1:
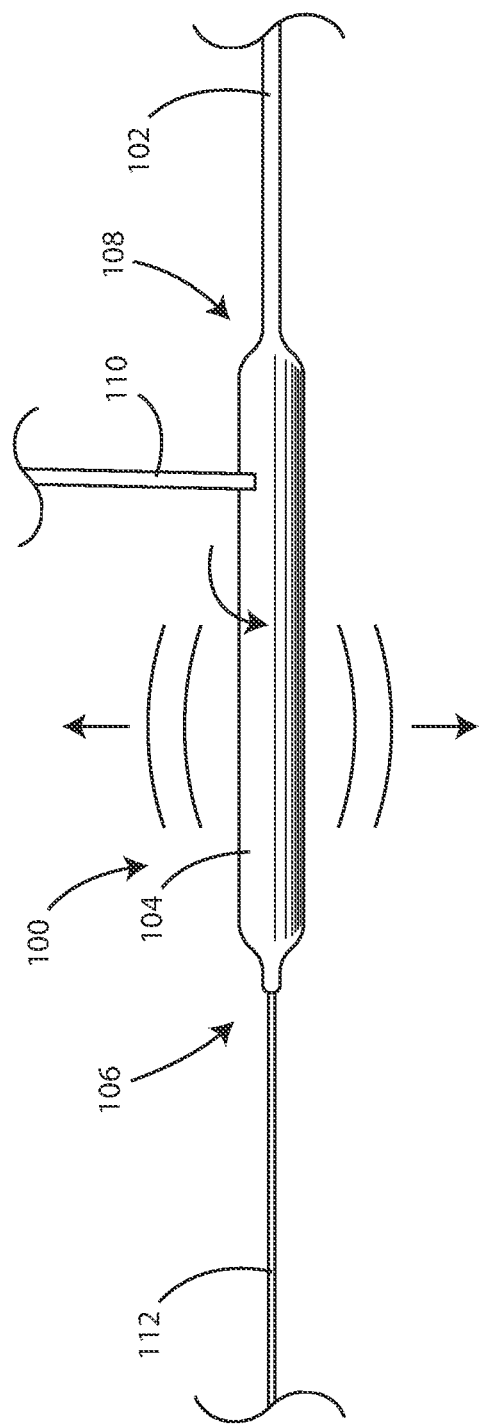
FIG. 1 is a schematic view of a balloon catheter being coated in accordance with various embodiments herein.

Referring now to FIG. 1, a schematic view of a balloon catheter 100 being coated is shown in accordance with various embodiments herein. The balloon catheter 100 serves as merely on example of a rotatable medical device herein. Many further examples of exemplary medical devices are provided below. The balloon catheter 100 includes a shaft 102 and a balloon 104 disposed on the shaft 102. The shaft 102 includes a distal end 106 and a proximal end 108. A fluid applicator tip 110 is shown as it may be positioned for the application of a coating fluid or coating solution. The coating fluid or coating solution can be applied to a balloon catheter to produce a drug-coated balloon useful for various types of therapeutic intervention.

In various embodiments, the fluid applicator tip 110 can be configured to contact a surface of the balloon catheter 100, which a coating fluid passing out of the fluid applicator tip 110 and onto the surface of the balloon 104. The balloon catheter 100 can be rotated as the fluid applicator tip 110 is move along the lengthwise axis of the balloon catheter 100. As such, the pattern of deposition of the coating solution generally resembles a helical or spiral pattern. A mandrel 112 can be used to hold the balloon catheter 100 as it rotates.

However, when the balloon catheter 100 is being rotated it can exhibit oscillations, as illustrated in FIG. 1, where it moves slightly in a direction that is lateral to the lengthwise axis the balloon catheter 100. Such oscillations are referred to herein as "wobble". This wobble can be detrimental to providing a uniform coating.

Figure 2:
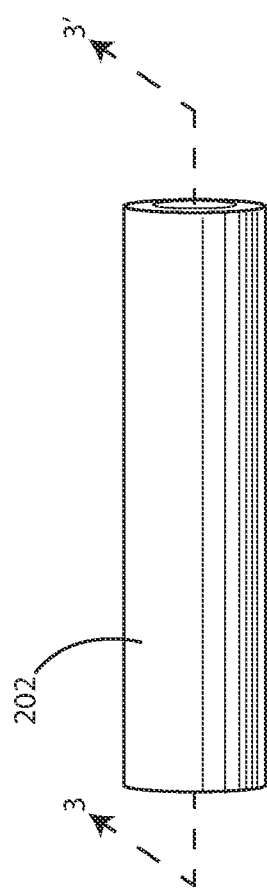
FIG. 2 is a schematic view of an inner collar in accordance with various embodiments herein.
Figure 3:
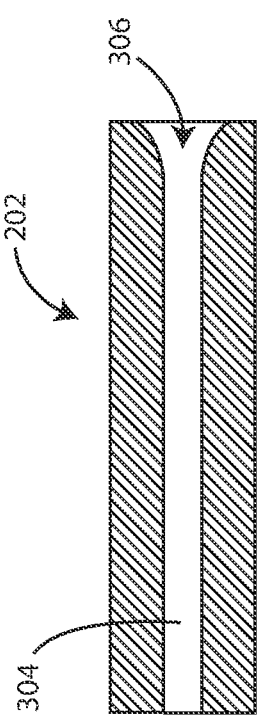
FIG. 3 is a cross-sectional view of an inner collar as taken along line 3-3' of FIG. 2 in accordance with various embodiments herein.

Devices and systems herein can include various components that can limit or eliminate any substantial wobble of a rotatable medical device as it is being coated. One component of the system can be an inner collar. Referring now to FIG. 2, a schematic view of an inner collar 202 is shown in accordance with various embodiments herein. As shown in FIG. 2, the inner collar 202 can define a channel (as shown in FIG. 3) and can fit over the mandrel 112 and/or over the shaft of a balloon catheter 100. In some embodiments, the inner collar 202 can be slide over the mandrel 112 and/or the shaft of the balloon catheter 100 and come to rest against or adjacent to the balloon 104 of the balloon catheter 100.

The inner collar 202 itself can within a channel of a rotating retention sleeve (described further below). The functionality of the inner collar 202 with respect to the rotating retention sleeve is described in greater detail below. The inner collar 202 can be formed of many different materials. In some embodiments, the inner collar 202 can include a polymer, a metal, a glass, a ceramic or a composite. An outside diameter of the inner collar 202 can approximately match an outside diameter of the balloon 104 of the balloon catheter 100 or an outside diameter of another component of a medical device to be coated. In some embodiments, an outside diameter of the inner collar 202 can be within 50, 40, 30, 20, 10, 5, 2.5, or 1 percent of the size of an outside diameter of the balloon 104 of the balloon catheter 100 or an outside diameter of another component of a medical device to be coated.

As used herein the terms "match" or "approximately match" with respect to a diameter size shall refer to one diameter being within 25 percent of the size of another diameter. As used herein the terms "match" or "approximately match" with respect to a rotation speed shall refer to one speed being within 25 percent of another speed.

Referring now to FIG. 3, a cross-sectional view of an inner collar 202 as taken along line 3-3' of FIG. 2 is shown in accordance with various embodiments herein. The inner collar 202 defines a collar channel 304 into which a shaft of a rotatable medical device can fit.

Therefore, the collar channel 304 can be sufficiently large to fit a mandrel used to support the rotatable medical device during a coating operation. The mandrel can be of various sizes. In some embodiments, the outside diameter of a shaft of a rotatable medical device can vary. In some embodiments, the outside diameter can be greater than or equal to 0.5, 1, 2, 3, or 4 mm. In some embodiments, the outside diameter can be less than or equal to 6, 4, or 2 mm. In some embodiments, the outside diameter can fall within a range of 0.5 to 6 mm, or 0.5 to 4 mm, or 0.5 to 2 mm. Reciprocally, the inside diameter of the collar channel 304 can vary. In some embodiments, the inside diameter can be greater than or equal to 0.5, 1, 2, 3, or 4 mm. In some embodiments, the inside diameter can be less than or equal to 6, 4, or 2 mm. In some embodiments, the inside diameter can fall within a range of 0.5 to 6 mm, or 0.5 to 4 mm, or 0.5 to 2 mm.

In some embodiments, the inner collar 202 also includes a contoured mouth 306 exhibiting a generally concave shape. The contoured mouth 306 can allow the inner collar 202 to fit more closely up against the balloon 104 of the balloon catheter 100. However, in some embodiments, the contoured mouth 306 can be omitted.

Figure 4:
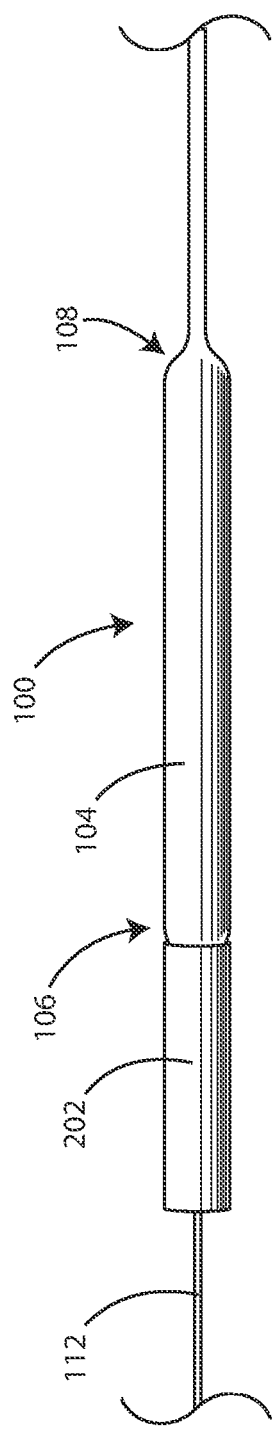
FIG. 4 is a schematic view of an inner collar fit over a shaft of a balloon catheter in accordance with various embodiments herein.

Referring now to FIG. 4, a schematic view of an inner collar 202 fit over a shaft 102 of a balloon 104 catheter is shown in accordance with various embodiments herein. The shaft includes a distal end 106 and a proximal end 108. The inner collar 202 can be fit over either the distal end 106 or the proximal end 108, depending on various factors such as the direction that the coating process will proceed (e.g., starting from the distal end or from the proximal end). Generally, the inner collar 202 is positioned on the downstream side of the balloon during the coating operation (e.g., if the coating is applied starting on the proximal side, then the inner collar 202 can be positioned on the distal side. The inner collar 202 can fit up against the side or edge of the balloon 104. In some embodiments, the inner collar 202 can be secured to the balloon catheter. However, in some embodiments the inner collar 202 fits over the shaft of the balloon catheter, but is not secured thereto.

In various embodiments, the inner collar 202 can work in conjunction with a rotating sleeve in order to prevent or eliminate wobble of the rotatable medical device. However, in some embodiments, the inner collar can be omitted and the system can rely upon the rotating sleeve in order to prevent or eliminate wobble.

Figure 5:
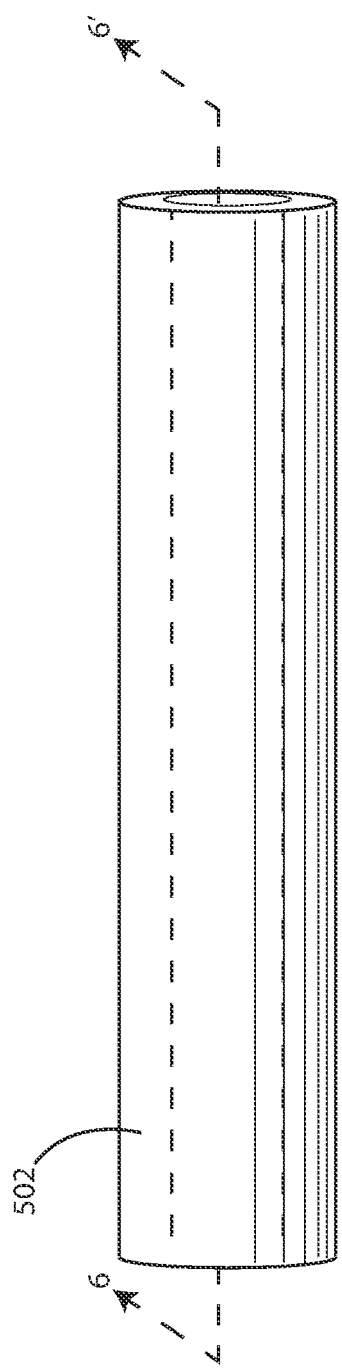
FIG. 5 is a schematic view of a rotating sleeve in accordance with various embodiments herein.

Referring now to FIG. 5, a schematic view of a rotating retention sleeve 502 is shown in accordance with various embodiments herein. The rotating retention sleeve 502 can be formed of many different materials. In some embodiments, the rotating retention sleeve 502 can include a polymer, a metal, a glass, a ceramic, or a composite.

Figure 6:
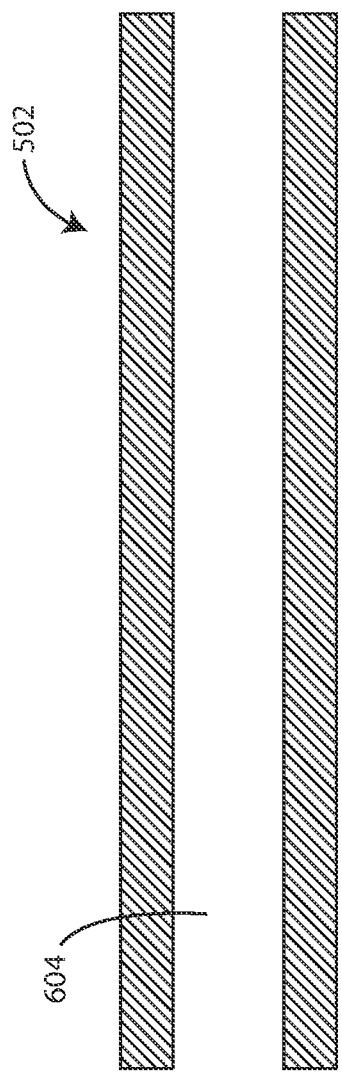
FIG. 6 is a cross-sectional view of a rotating sleeve as take along line 6-6' of FIG. 5 in accordance with various embodiments herein.

Referring now to FIG. 6, a cross-sectional view of the rotating retention sleeve 502 as taken along line 6-6' of FIG. 5 is shown in accordance with various embodiments herein. As can be seen, the rotating retention sleeve 502 can define a channel 604.

In various embodiments, a rotatable medical device 100 and/or portions thereof can fit within the channel 604. In specific, the channel 604 can be sufficiently large to fit a balloon 104 of the rotatable medical device 100 therein along with, if present, an inner collar 202. It will be appreciated, however, that medical devices can be coated herein beyond just those including balloons. As such, in some embodiments, the channel 604 can be sufficiently large to fit a component to be coated of the rotatable medical device 100 therein along with, if present, an inner collar 202.

The balloons of medical devices herein (in the case of coating medical device including balloons) can have an outside diameter of various dimensions. In some embodiments, the outside diameter can be greater than or equal to 0.5, 1, 2, 4, 6, 8, 10, 12, 14, 17, 20, 23, or 26 mm. In some embodiments, the outside diameter can be less than or equal to 35, 30, 26, 23, 19, 16, or 12 mm. In some embodiments, the outside diameter can fall within a range of 0.5 to 30 mm, 0.5 to 26 mm, or 2 to 12 mm. Reciprocally then, the inner diameter of the channel 604 of the rotating retention sleeve can be greater than or equal to 0.5, 1, 2, 4, 6, 8, 10, 12, 14, 17, 20, 23, or 26 mm. In some embodiments, the inner diameter can be less than or equal to 35, 30, 26, 23, 19, 16, or 12 mm. In some embodiments, the inner diameter can fall within a range of 0.5 to 30 mm, 0.5 to 26 mm, or 2 to 12 mm. In some embodiments, the outside diameter of the balloon or other component to be coated can be within 40, 30, 20, 10, 5, 2.5, or 1 percent of the size of the inner diameter of the channel 604.

Figure 7:
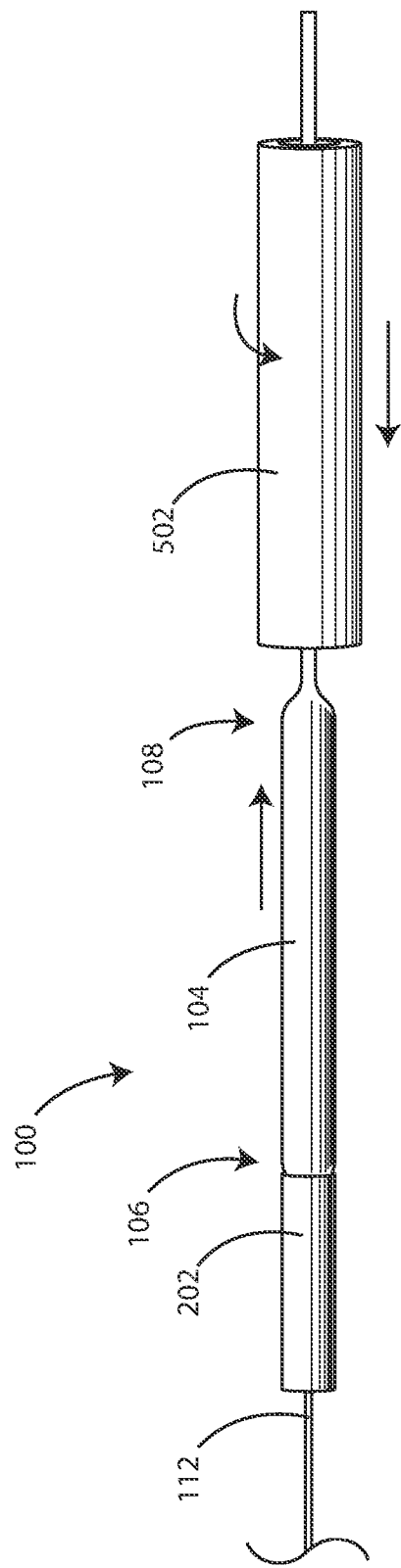
FIG. 7 is a schematic view of a rotating sleeve fit over a balloon catheter in accordance with various embodiments herein.

Referring now to FIG. 7, a schematic view of a rotating sleeve fit over a balloon catheter 100 is shown in accordance with various embodiments herein. The shaft of the balloon catheter 100 includes a distal end 106 and a proximal end 108. The rotatable medical device also includes a balloon 104. The inner collar 202 of the coating system fits over the shaft of the balloon catheter 100. In turn, both the inner collar 202 and the balloon catheter 100 fit within the rotating retention sleeve 502 and can slide therein.

In operation, a rotatable medical device can be rotated during a coating operation. The rotating retention sleeve can, in turn, can be rotated at a speed that approximately matches a rotation speed of the rotatable medical device. By virtue of the rotatable medical device fitting within a channel of the rotating retention sleeve, the rotating retention sleeve can physically limit the amount of wobble that is possible for the rotatable medical device to undergo. The coating applicator tip trails behind the rotating retention sleeve as both move along the lengthwise axis of the rotatable medical device. Because the rotating retention sleeve can rotate at a speed approximating the speed of rotation of the rotating medical device (by virtue of being driven at that speed or freely rotating under the influence of the rotatable medical device), the amount of friction and other forces between the rotating retention sleeve and the rotatable medical device can be minimized to prevent any inadvertent damage to the rotatable medical device and portions thereof such as a balloon.

Figure 8:
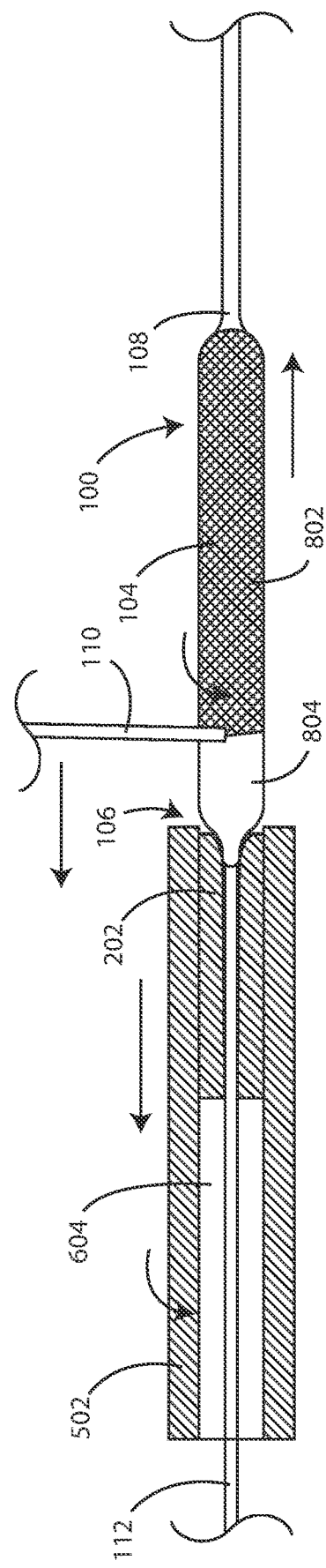
FIG. 8 is a partial sectional view of a balloon catheter being coated in accordance with various embodiments herein.

Referring now to FIG. 8, a partial sectional view of a balloon 104 catheter being coated is shown in accordance with various embodiments herein. As before, the balloon catheter can include a shaft with a distal end 106 and a proximal end 108 as well as a balloon 104. In this view, the balloon 104 includes a coated portion 802 and an uncoated portion 804.

The coating system includes an inner collar 202, a rotating retention sleeve 502, and a fluid applicator tip 110. The rotating retention sleeve 502 defines a channel 604 into which balloon catheter 100 fits, physically limiting the amount of wobble that the balloon catheter 100 can undergo. The fluid applicator tip 110 trails behind the rotating retention sleeve 502 as both move along the lengthwise axis of the balloon catheter 100. As the balloon catheter 100 exits the channel of the rotating retention sleeve 502, the smaller diameter of the shaft versus the balloon allows for more lateral play of the balloon catheter relative to the rotating retention sleeve 502. However, because of the inner collar 202, the lateral play is effectively taken up allowing for the system to control wobble as the fluid applicator tip 110 coats up to the end of the balloon 104 of the balloon catheter 100.

Figure 9:
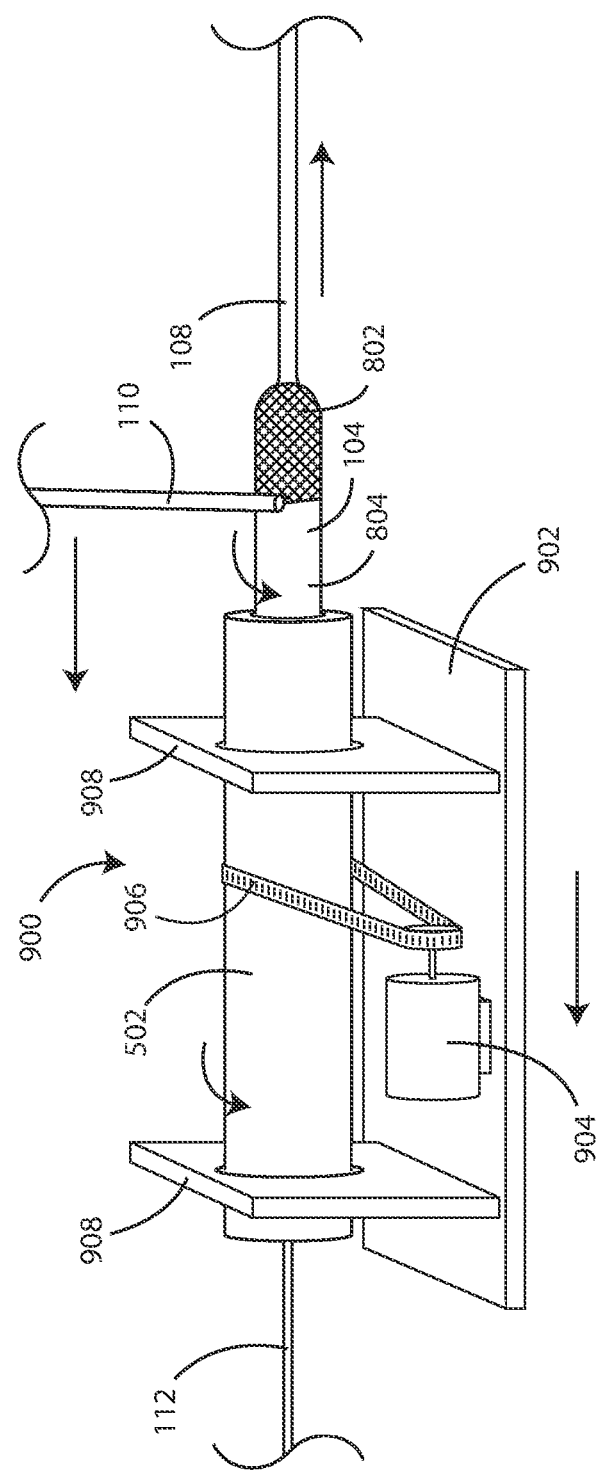
FIG. 9 is a schematic view of a fluid applicator unit in accordance with various embodiments herein.

It will be appreciated that coating systems herein can include various other components. Referring now to FIG. 9, a schematic view of a fluid applicator unit 900 is shown in accordance with various embodiments herein. In this view, the fluid applicator unit 900 is being used to coat a rotatable medical device including a shaft with a distal end 106 and a proximal end 108 along with a balloon 104. In this view, the balloon 104 includes a coated portion 802 and an uncoated portion 804.

The fluid applicator unit 900 can include a fluid applicator tip 110 and a rotating retention sleeve 502. The fluid applicator unit 900 also includes a retention sleeve drive mechanism 904. The retention sleeve drive mechanism 904 can include an electric motor. In this particular example, the retention sleeve drive mechanism 904 includes a drive belt 906 to transfer power to the rotating retention sleeve 502. However, in other embodiments, other mechanisms can be used including, but not limited to, drive gears, a drive chain, a drive shaft, and the like.

Various components of the fluid applicator unit 900 can be mounted together on a platform 902. The fluid applicator unit 900 can also include one or more support brackets 908 which can be used to secure the rotating retention sleeve 502 to the rest of the fluid applicator unit 900, while allowing the rotating retention sleeve 502 to rotate freely as driven by the retention sleeve drive mechanism 904. In some embodiments, the support brackets can include mechanisms to support the rotating retention sleeve 502 such as bushings or bearings.

In various embodiments, the fluid applicator unit 900 can be configured to move relative to a rotatable medical device 100 along a lengthwise axis thereof. The movement can be relative in the sense that in some embodiments, the fluid applicator unit 900 can be configured to move along the lengthwise axis of the rotatable medical device. In some embodiments, the fluid applicator unit 900 can be stationary and the rotatable medical device can move in the direction of its lengthwise axis. In some embodiments, both the fluid applicator unit 900 and the rotatable medical device can move.

In some embodiments, the relative speed between the fluid applicator and the rotatable medical device can be greater than or equal to 0.1 mm/s, 0.5 mm/s, 0.9 mm/s, 1.2 mm/s, 1.6 mm/s, or 2.0 mm/s. In some embodiments, the speed can be less than or equal to 30.0 mm/s, 25 mm/s, 20 mm/s, 15 mm/s, 10 mm/s, or 5 mm/s. In some embodiments, the speed can fall within a range of 0.1 mm/s to 30.0 mm/s, or 0.5 mm/s to 25 mm/s, or 0.9 mm/s to 20 mm/s, or 1.2 mm/s to 15 mm/s, or 1.6 mm/s to 10 mm/s.

In various embodiments, the retention sleeve drive mechanism 904 can be configured to rotate a rotating retention sleeve 502 at a speed approximately matching a speed of rotation of the medical device being coated as driven by a rotation mechanism (described further below). For example, in various embodiments, the retention sleeve drive mechanism 904 can be configured to rotate a rotating retention sleeve 502 at a speed within 10, 8, 5, 4, 3, 2, 1, or 0.1 percent of the speed of rotation of a rotation mechanism that is rotating the medical device being coated itself. By matching speeds, very little force is exerted on the surface of the medical device by the rotating retention sleeve as the medical device passes therethrough because the rotational speeds are matched. This can serve to prevent inadvertent damage to the medical device during the coating process.

The specific rotation speed of the retention sleeve drive mechanism 904 can vary. In some embodiments, the rotation speed can be greater than or equal to 25, 50, 75, 100, 125, or 150 RPM. In some embodiments, the rotation speed can be less than or equal to 1500, 1200, 1000, 750, 500, 400, 350, 300, 250, 200, or 150 RPM. In some embodiments, the rotation speed can fall within a range of 25 to 1500 RPM, or 50 to 1250 RPM, or 100 to 1200 RPM, or 150 to 500 RPM.

Figure 10:
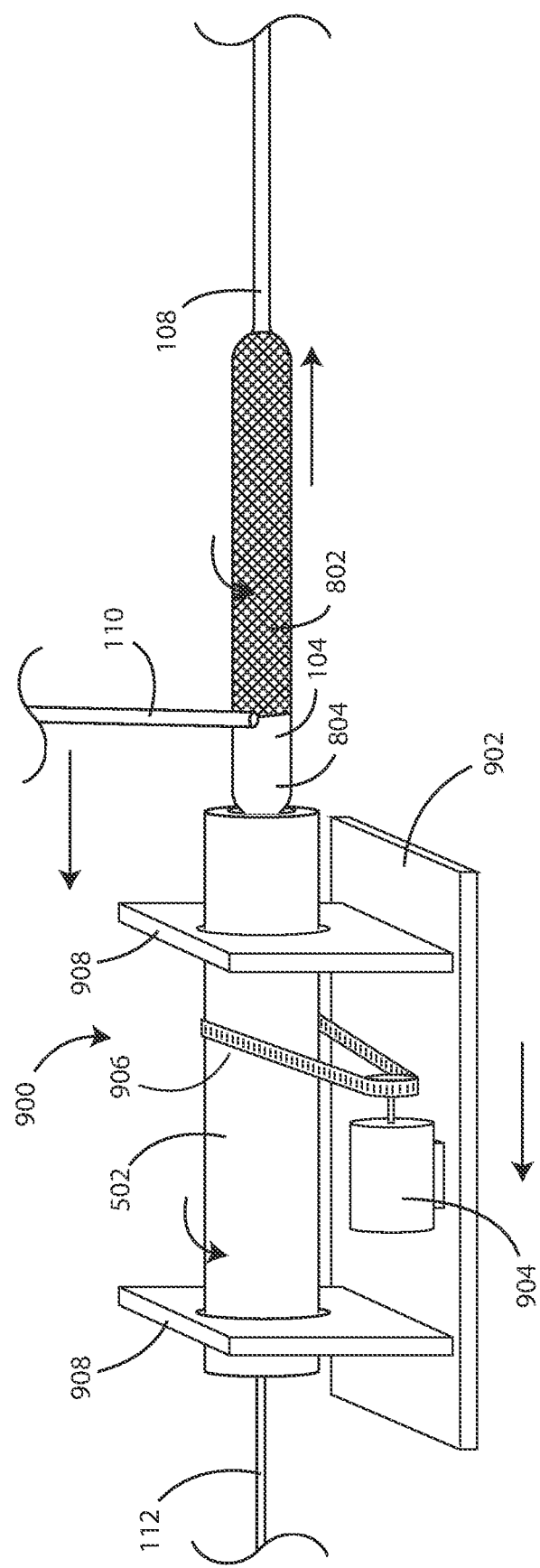
FIG. 10 is a schematic view of a fluid applicator unit in accordance with various embodiments herein.

Referring now to FIG. 10, a schematic view of a fluid applicator unit 900 is shown in accordance with various embodiments herein. FIG. 10 shows a fluid applicator unit 900 consistent with that shown in FIG. 9. However, as depicted in FIG. 10, the balloon catheter has passed farther through the rotating retention sleeve 502 and a greater portion of the balloon 104 has been coated.

Figure 11:
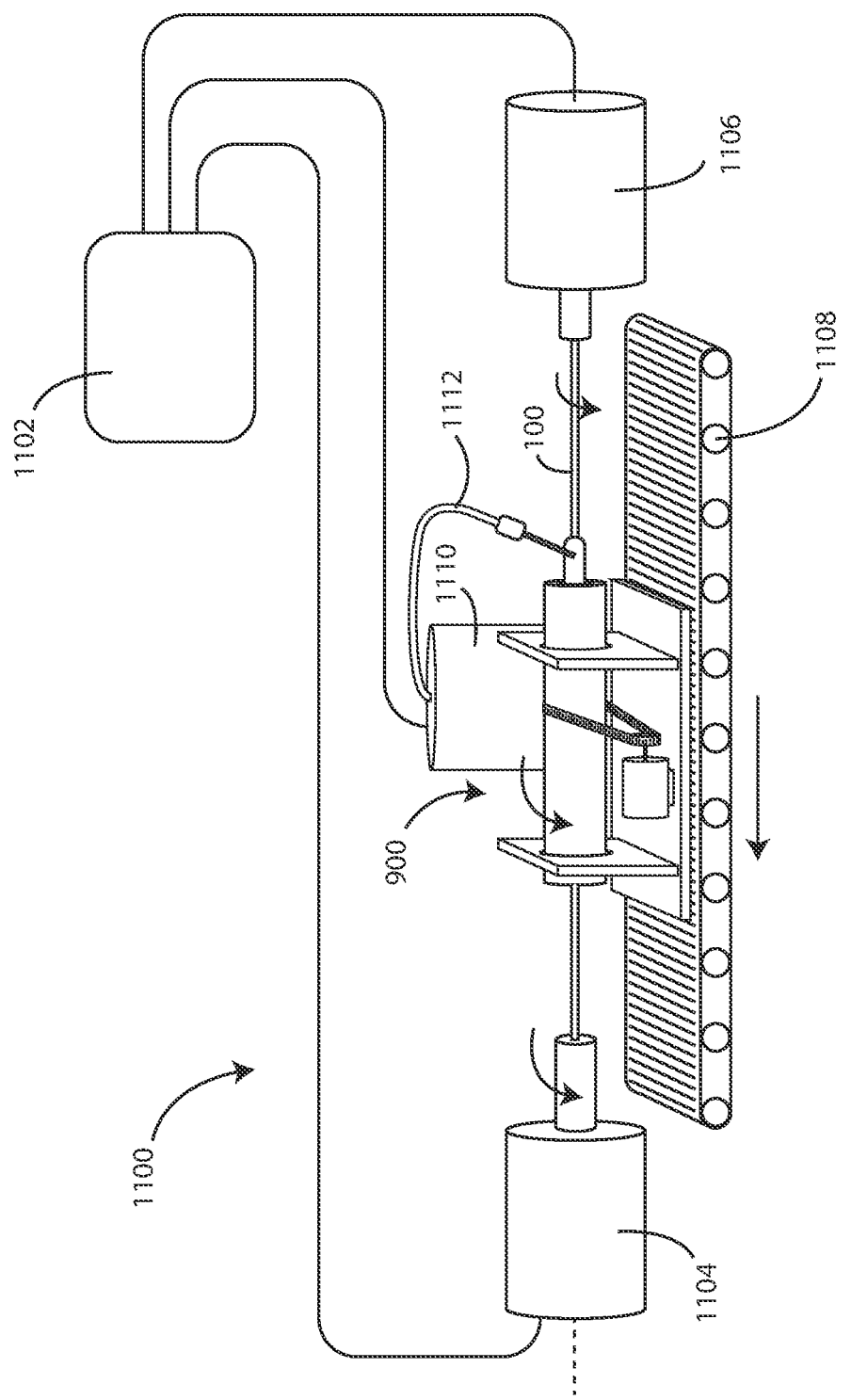
FIG. 11 is a schematic view of a coating application system in accordance with various embodiments herein.

Coating systems herein can include various other components. Referring now to FIG. 11, a schematic view of a coating application system 1100 is shown in accordance with various embodiments herein. FIG. 11 shows a rotatable medical device 100 being coated by the coating application system 1100.

The coating application system 1100 includes a fluid applicator unit 900 and rotation mechanism including a first end drive unit 1104 and a second end drive unit 1106. The first end drive unit 1104 and a second end drive unit 1106 are attached to opposed ends of a rotatable medical device 100. Each of the first end drive unit 1104 and the second end drive unit 1106 can include an electric motor or another source of power to rotate the rotatable medical device 100.

The first end drive unit 1104 and the second end drive unit 1106 can rotate at various speeds. Generally, the first end drive unit 1104 and the second end drive unit 1106 can be controlled to rotate at the same speed as each other. In some embodiments, the rotation speed can be greater than or equal to 25, 50, 75, 100, 125, or 150 RPM. In some embodiments, the rotation speed can be less than or equal to 1500, 1250, 1000, 750, 500, 400, 350, 300, 250, 200, or 150 RPM. In some embodiments, the rotation speed can fall within a range of 25 to 1500 RPM, or 50 to 1250 RPM, or 100 to 1200 RPM, or 150 to 500 RPM. In some embodiments, however, one of the first end drive unit 1104 and the second end drive unit 1106 can be omitted. For example, one end of the rotatable medical device 100 can be directly driven by a drive unit and the other end can freely rotate without be directly driven.

The fluid applicator unit 900 can also include a fluid supply reservoir 1110 and a fluid supply line 1112, which can convey a coating fluid (described further below) to the coating applicator tip. In some embodiments, a pump (not shown) can also be used to convey coating fluid to the coating applicator tip from the fluid supply reservoir 1110.

The coating application system 1100 also includes a system controller 1102, which can be used to control operations of the system including, but not limited to, controlling the fluid applicator unit 900 and the rotation mechanism and components thereof. The system controller 1102 can include a processing unit such as a microprocessor, a microcontroller, an ASIC, or the like.

The coating application system 1100 can also include a fluid applicator unit conveyor 1108. The fluid applicator unit conveyor 1108 can be used to move the fluid applicator unit 900 with respect to the longitudinal axis of the rotatable medical device 100 during a coating operation. The fluid applicator unit conveyor 1108 can be of various types. In some embodiments, the fluid applicator unit conveyor 1108 can be a belted unit, a track, a conveyor belt, a linear actuator, or the like.

In some embodiments, the rotating retention sleeve may not be driven to rotate (e.g., not driven by a motor). Rather, it can just freely rotate such as supported by bushing, bearings, or the like and through contact with the balloon catheter can assume a rotation speed roughly equal to the rotation speed of the balloon catheter.

Figure 12:
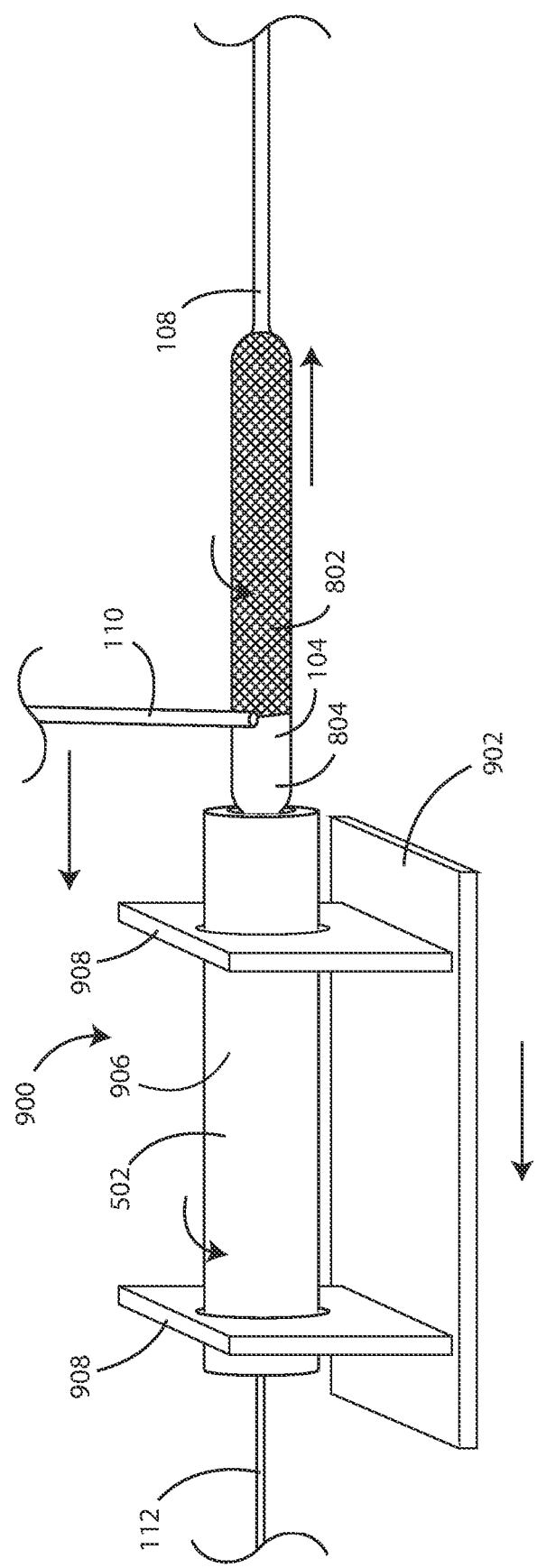
FIG. 12 is a schematic view of a fluid applicator unit in accordance with various embodiments herein.

Referring now to FIG. 12, a schematic view of a fluid applicator unit 900 is shown in accordance with various embodiments herein. FIG. 12 shows a fluid applicator unit 900 that is consistent with that shown in FIG. 10. However, in this embodiment, there is no retention sleeve drive mechanism 904 or drive belt 906.

Methods

Many different methods are contemplated herein, including, but not limited to, methods of making, methods of using, and the like. Aspects of system/device operation described elsewhere herein can be performed as operations of one or more methods in accordance with various embodiments herein.

In an embodiment, a method of coating a rotatable medical device is included, the method can include fitting the rotatable medical device within a rotating retention sleeve of a fluid applicator unit, rotating the rotatable medical device with a rotation mechanism, rotating the rotating sleeve at a speed matching the rotation speed of the rotatable medical device, and moving the fluid applicator relative to a lengthwise axis of the rotatable medical device while applying a coating solution onto a surface of the rotatable medical device using a fluid applicator tip or other fluid applicator.

In an embodiment, the method can further include fitting an inner collar over a shaft of the rotatable medical device.

In various embodiments of the method, the rotatable medical device comprises a balloon catheter. However, many other medical devices are contemplated herein as described more fully below.

Medical Devices

It will be appreciated that many different medical devices can be coated using equipment and methods herein. In various embodiments, rotatable medical device can be coated using equipment and methods described herein. In various embodiments, relatively long medical devices (such as those having a length that it is at least 20 times their diameter) can be coated using equipment and methods described herein.

One type of medical device is a balloon catheter. Balloon catheter constructions are well known in the art and are described in various documents, for example, U.S. Pat. Nos. 4,195,637, 5,041,089, 5,087,246, 5,318,587, 5,382,234, 5,571,089, 5,776,101, 5,807,331, 5,882,336, 6,394,995, 6,517,515, 6,623,504, 6,896,842, and 7,163,523. Balloon catheters generally include four portions, the balloon, catheter shaft, guide wire, and manifold. A balloon catheter generally includes an elongated catheter shaft with an inflatable balloon attached to a distal section of the catheter shaft. At a proximal end of the catheter shaft, there is typically a manifold. At the manifold end, placement of the catheter can be facilitated using a guide wire. Guide wires are small and maneuverable when inserted into an artery. Once the guide wire is moved to the target location, the catheter with balloon portion is then fed over the guide wire until the balloon reaches the target location in the vessel. The balloon is typically inserted into the arterial lumen of a patient and advanced through the lumen in an unexpanded state. The balloon is then inflated when the catheter reaches target site resulting in application of mechanical force sufficient to cause vessel dilation. The balloon is typically inflated using a fluid, which is injected through an inflation port. The manifold can control the fluid introduction within shaft for expansion of the balloon. The mechanics of fluid transfer and introduction within balloons vary according to the specific design of the catheter, and are well known in the art.

Coating Solutions

It will be appreciated that coating solutions/fluids/compositions applied onto medical devices herein can include various components including, but not limited to, one or more active agents, carrier agents and/or solvents, polymers (including degradable or non-degradable polymers), cross-linking agents, excipients, and the like. The relative amounts of the components of the coating solution can depend on various factors including the desired amount of active agent to be applied to the balloon and the desired release rate of the active agent. Exemplary coating compositions are described in U.S. Publ. Pat. Appl. No. 2018/0110903, the content of which is herein incorporated by reference. Exemplary cross-linking agents are described in U.S. Pat. No. 8,889,760, the content of which is herein incorporated by reference.

In some embodiments, active agents can specifically include those wherein the coating solution is the form of a suspension or emulsion including active agent particles.

In some embodiments, the coating solution/fluid/composition can omit an active agent. In some embodiments, the coating solution/fluid/composition can include a hydrophilic polymer.

Fluid Applicators

It will be appreciated that while the embodiments of the figures shown herein have depicted fluid applicator units including a fluid applicator tip (as an example of a contact-based fluid applicator) many other types of contact-based and non-contact fluid applicators are specifically contemplated herein. For example, fluid applicators herein can include spray nozzles, ultrasonic applicators, plate applicators, ink jets, brushes, and the like.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A coating system for coating rotatable medical devices comprising:
   a rotation mechanism, wherein the rotation mechanism is configured to mount and rotate a rotatable medical device;
   a fluid applicator unit, the fluid applicator unit comprising
      a fluid applicator tip configured to apply a coating to the rotatable medical device; and
      a rotating retention sleeve, the rotating retention sleeve defining a channel, wherein the rotatable medical device fits within the channel of the rotating retention sleeve,
      wherein the fluid applicator tip is configured to apply the coating to the rotatable medical device at a location that is not between a proximal end of the rotating retention sleeve and a distal end of the rotating retention sleeve; and
   an inner collar, the inner collar defining a channel, wherein the inner collar fits within the channel of the rotating retention sleeve, and wherein an outside diameter of the inner collar is configured to match an outside diameter of a portion of the rotatable medical device.

2. A coating system for coating rotatable medical devices comprising:

a rotation mechanism, wherein the rotation mechanism is configured to mount and rotate a rotatable medical device; and a fluid applicator unit, the fluid applicator unit comprising
a fluid applicator tip configured to apply a coating to the rotatable medical device; and
a rotating retention sleeve, the rotating retention sleeve defining a channel, wherein the rotatable medical device fits within the channel of the rotating retention sleeve,
wherein the fluid applicator unit is configured such that the fluid applicator tip does not apply the coating to the rotatable medical device at a location that is between a proximal end of the rotating retention sleeve and a distal end of the rotating retention sleeve and the fluid applicator unit is further configured such that the fluid applicator tip does not apply the coating to the rotating retention sleeve at a location that is between the proximal end of the rotating retention sleeve and the distal end of the rotating retention sleeve.

3. The coating system for coating rotatable medical devices of claim 2, wherein the fluid applicator unit is configured to move relative to the rotatable medical device along a lengthwise axis thereof.

4. The coating system for coating rotatable medical devices of claim 2, further comprising:
an inner collar, the inner collar defining a channel;
wherein the inner collar fits within the channel of the rotating retention sleeve.

5. The coating system for coating rotatable medical devices of claim 4, wherein a mandrel fits within the channel of the inner collar.

6. The coating system for coating rotatable medical devices of claim 2, the fluid applicator unit further comprising a retention sleeve drive mechanism, wherein the retention sleeve drive mechanism is configured to rotate the rotating retention sleeve.

7. The coating system for coating rotatable medical devices of claim 6, wherein the retention sleeve drive mechanism is configured to rotate the rotating retention sleeve at a speed within 5 percent of the speed of rotation of the rotation mechanism.

8. The coating system for coating rotatable medical devices of claim 6, wherein the retention sleeve drive mechanism is configured to rotate the rotating retention sleeve at a speed matching a speed of rotation of the rotation mechanism.

9. The coating system for coating rotatable medical devices of claim 6, wherein the retention sleeve drive mechanism is configured to rotate the rotating retention sleeve at a speed of 100 to 1200 RPM.

10. The coating system for coating rotatable medical devices of claim 6, wherein the retention sleeve drive mechanism is configured to rotate the rotating retention sleeve at a speed of 150 to 500 RPM.

11. The coating system for coating rotatable medical devices of claim 2, wherein an outside diameter of a component of the medical device to be coated matches an inside diameter of the channel of the rotating retention sleeve.

12. The coating system for coating rotatable medical devices of claim 2, the rotation mechanism comprising:
a first end drive unit; and
a second end drive unit;
wherein the first end drive unit and the second end drive unit are attached to opposed ends of the rotatable medical device.

* * * * *